(12) United States Patent
Lew et al.

(10) Patent No.: US 9,693,034 B2
(45) Date of Patent: Jun. 27, 2017

(54) APPARATUS AND METHOD FOR LOCALIZING OBJECTS FOR DISTANCE AND/OR IN THREE DIMENSIONS USING A SPIRAL POINT SPREAD FUNCTION

(71) Applicant: The Board of Trustees of the Leland Stanford Junior University, Palo Alto, CA (US)

(72) Inventors: Matthew D. Lew, East Palo Alto, CA (US); William E. Moerner, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 756 days.

(21) Appl. No.: 13/712,728

(22) Filed: Dec. 12, 2012

(65) Prior Publication Data
US 2013/0147925 A1    Jun. 13, 2013

Related U.S. Application Data

(60) Provisional application No. 61/570,181, filed on Dec. 13, 2011.

(51) Int. Cl.
*H04N 13/02* (2006.01)
*G01S 11/12* (2006.01)

(52) U.S. Cl.
CPC ......... *H04N 13/0203* (2013.01); *G01S 11/12* (2013.01)

(58) Field of Classification Search
CPC ..................... H04N 13/02–13/0296
See application file for complete search history.

(56) References Cited

U.S. PATENT DOCUMENTS

| | | | |
|---|---|---|---|
| 7,342,717 B1 | 3/2008 | Hausmann et al. | |
| 7,705,970 B2 | 4/2010 | Piestun et al. | |
| 8,558,873 B2 | 10/2013 | McEldowney | |
| 8,586,945 B2 | 11/2013 | Reuss et al. | |
| 8,608,314 B2 | 12/2013 | Yoon et al. | |
| 2006/0126921 A1 | 6/2006 | Shorte et al. | |
| 2006/0274394 A1* | 12/2006 | Riley et al. | 359/15 |
| 2007/0146873 A1* | 6/2007 | Ortyn et al. | 359/386 |

(Continued)

OTHER PUBLICATIONS

Pavani, Sri Rama Prasanna, "Three-Dimensional Nanoscopy With a Double-Helix Microscope" (2009).*

(Continued)

*Primary Examiner* — William C Vaughn, Jr.
*Assistant Examiner* — Lindsay Uhl
(74) *Attorney, Agent, or Firm* — Crawford Maunu PLLC

(57) ABSTRACT

Various aspects of the present disclosure are directed toward methods, systems, and apparatus that include an optical detection node to pass light through the optical pathway to the optical detection node where the light is detectable. At least one focusing element is provided to pass the light along the optical pathway, and at least one optical mask is used to provide spatially-varying modulation on the light passing along the optical pathway. The light passing along the optical pathway is redirected and modified to create a spiral point spread function at the optical detection node for estimating a distance to an object that is characterized at least in part by the light passing along the optical pathway.

21 Claims, 19 Drawing Sheets

(56) References Cited

U.S. PATENT DOCUMENTS

| | | | | |
|---|---|---|---|---|
| 2008/0137059 | A1* | 6/2008 | Piestun | G01C 3/08 356/4.01 |
| 2010/0278400 | A1 | 11/2010 | Piestun et al. | |
| 2011/0002530 | A1 | 1/2011 | Zhuang et al. | |
| 2011/0096981 | A1* | 4/2011 | Arnison | G03F 9/7026 382/151 |
| 2011/0174986 | A1 | 7/2011 | Kempe et al. | |
| 2011/0249866 | A1 | 10/2011 | Piestun et al. | |

OTHER PUBLICATIONS

Lew, Matthew, et al., "Corkscrew point spread function for far-field three-dimensional nanoscale localization of pointlike objects", Optics Letters, vol. 36, No. 2 (Jan. 15, 2011).*
Pavani, S., "Three-Dimensional Nanoscopy With a Double-Helix Microscope", Dissertation Abstracts International, vol. 71-01, Section B, p. 551 (2009).*
Pavani et al: "Three-dimensional, single-molecule fluorescence imaging beyond the diffraction limit by using a double-helix point spread function", PNAS, Mar. 3, 2009, and online published, Feb. 11, 2009, pp. 2995-2999.
Pavani et al: "Three dimensional tracking of fluorescent microparticles using a photo-limited double-helix response system", Optics Express, 2008.
Thomann et al: "Automatic fluorescent tag detection in 3D with super-resolution: application to analysis of chromosome movement", J. of Microscopy, 2002.
Juette, Three-dimensional sub-1 00 nm resolution fluorescence microscopy of thick samples, 2008, Nat Methods 5:527-529.
E. Toprak et al., "Defocused orientation and position imaging (DOPI) of myosin V," PNAS 103, 6495-6499 (2006).
T. Gould et al., "Nanoscale imaging of molecular positions and anisotropies," Nature Methods 5, 1027-1030 (2008).
M. Backlund et al., "Simultaneous, accurate measurement of the 3D position and orientation of single molecules," PNAS 109, 19087-19092, (2012).
Davis et al., "Interferometric Synthetic Aperture Microscopy: Computed Imaging for Scanned Coherent Microscopy", Sensors 2008, 8, pp. 3903-3931.
Backlund et al., "The Role of Molecular Dipole Orientation in Single-Molecule Fluorescence Microscopy and Implications for Super-Resolution Imaging" ChemPhysChem 2014, 15, 587-599.
Toprak et al., "New Fluorescent Tools for Watching Nanometer-Scale Conformational Changes of Single Molecules Annual Review of Biophysics and Biomolecular Structure," vol. 36: 349-369 (Volume publication date Jun. 2007).
Backlund et al., "The Double-helix point spread function enables precise and accurate measurement of 3D single-molecule localization and orientation", Proc Soc Photo Opt Instrum Eng. Feb. 22, 2013; 8590.
M. Thompson et al., "Three-dimensional tracking of single mRNA particles in *Saccharomyces cerevisiae* using a double helix point spread function", PNAS 107, 17864-17871 (2010).
A. Gahlmann et al., "Quantitative Multicolor Subdiffraction Imaging of Bacterial Protein Ultrastructures in Three Dimensions", Nano Lett. 13, 987-993 (2013) Abstract.
T. Ha et al.,"Hindered Rotational Diffusion and Rotational Jumps of Single Molecules" PRL 80, 2093-2096 (1998). Abstract Only.
H. Sosa & E. Peterman et al., "ADP-induced rocking of the kinesin motor domain revealed by single-molecule fluorescence polarization microscopy" Nature Struct. Bio. 8, 540-544 (2001).
A. Backer et al., "Single-molecule orientation measurements with a quadrated puupil", Optics Lett., 38, 1521-1523 (2013).
Tseng, "Ultrafast Coherent Control Spectroscopy" dissertation, Stony Brook University, 2012.
Engelhardt, Johann, et al. "Molecular orientation affects localization accuracy in superresolution far-field fluorescence microscopy." Nano letters 11.1 (2010): 209-213.
M. Lew & M. Backlund, "Rotational Mobility of Single Molecules Affects Localization Accuracy in Super-Resolution Fluorescence Microscopy" Nano Lett. 13, 3967-3972 (2013).
Böhmer, Martin, and Jörg Enderlein. "Orientation imaging of single molecules by wide-field epifluorescence microscopy." JOSA B 20.3 (2003): 554-559.
Axelrod, Daniel. "Fluorescence excitation and imaging of single molecules near dielectric-coated and bare surfaces: a theoretical study." Journal of microscopy 247.2 (2012): 147-160.
H. D. Lee, S. J. Sahl, M. D. Lew and W. E. Moerner, "The double-helix microscope super-resolves extended biological structures by localizing single blinking molecules in three dimensions with nanoscale precision" Appl. Phys. Lett. 100, 153701 (2012).
Lew, Matthew D., Alexander RS von Diezmann, and W. E. Moerner. "Easy-DHPSF open-source software for three-dimensional localization of single molecules with precision beyond the optical diffraction limit." Protocol exchange 2013 (2013).
Sahl, S. J., and W. E. Moerner. "Super-resolution fluorescence imaging with single molecules." Current opinion in structural biology 23.5 (2013): 778-787.
Rust, Michael J., Mark Bates, and Xiaowei Zhuang. "Sub-diffraction-limit imaging by stochastic optical reconstruction microscopy (Storm)." Nature Methods 3.10 (2006).
Stallinga, Sjoerd, and Bernd Rieger. "Accuracy of the Gaussian Point Spread Function model in 2D localization microscopy." (2010).
Enderlein, Jörg, Erdal Toprak, and Paul R. Selvin. "Polarization effect on position accuracy of fluorophore localization." (2006).
Mortensen, Kim I., et al. "optimized localization analysis for single-molecule tracking and super-resolution microscopy." nature methods 7.5 (2010): 377.
J. R. Lakowicz, Principles of Fluorescence Spectroscopy, 3rd edn. (Springer Science, New York, 2006).
Chao, Jerry, E. Sally Ward, and Raimund J. Ober. "Fisher information matrix for branching processes with application to electron-multiplying charge-coupled devices.".
Lord, Samuel J., et al. "Photophysical Properties of Acene DCDHF Fluorophores: Long-Wavelength Single-Molecule Emitters Designed for Cellular Imaging." J. Phys. Chem. A 111 (2007): 8934-8941.
Bates, Mark, et al. "Multicolor Super-Resolution Fluorescence Imaging via Multi-Parameter Fluorophore Detection." ChemPhysChem 13, 99 (2012).
Testa, Ilaria, et al. "Nanoscale separation of molecular species based on their rotational mobility." Opt.Express 16, 21093 (2008).
Kao, H. P. and Verkman, A. S., "Tracking of Single Fluorescent Particles in Three Dimensions: Use of Cylindrical Optics to Encode Particle Position," Biophys. J. 67, pp. 1291-1300, (1994).
Piestun, R.; Schechner, Y. Y. and Shamir, J., "Propagation-Invariant Wave Fields with Finite Energy," J. Opt. Soc. Am. A, vol. 17, No. 2, (2000).
Thompson, R. E.; Larson, D. R. and Webb, W. W., "Precise Nanometer Localization Analysis for Individual Fluorescent Probes," Biophys J, vol. 82, pp. 2775-2783, (2002).
Ober, R. J.; Ram, S. and Ward, E. S., "Localization Accuracy in Single-Molecule Microscopy," Biophys J., vol. 86, pp. 1185-1200, (2004).
Prabhat, P.; Ram, S.; Ward, E. S. and Ober, R. J., "Simultaneous Imaging of Different Focal Planes in Fluourescence Microscopy for the Study of Cellular Dynamics in Three Dimensions," IEEE Transactions on Nanobioscience 3(4), pp. 237-242, (2004).
Betzig, E.; Patterson, G. H.; Sougrat, R.; Lindwasser, O. W.; Olenych, S.; Bonifacino, J. S.; Davidson, M. W.; Lippincott-Schwartz, J. and Hess, H. F., "Imaging Intracellular Fluorescent Proteins at Nanometer Resolution," Science, vol. 313, pp. 1642-1645, (2006).
Greengard, A.; Schechner, Y. Y. and Piestun, R., "Depth from Diffracted Rotation," Opt. Lett., vol. 31, No. 2, (2006).
Hess, S. T. Girirajan, T. P. K. and Mason, M. D., "Ultra-high Resolution Imaging by Fluorescence Photoactivation Localization Microscopy," Biophys J., vol. 91, pp. 4258-4272, (2006).
Ram, S.; Prabhat, P.; Chao, J.; Ward, E. S. and Ober, R. J., "High Accuracy 3D Quantum Dot Tracking with Multifocal Plane Micros-

(56) References Cited

OTHER PUBLICATIONS copy for the Study of Past Intracellular Dynamics in Live Cells," Biophys. J. vol. 95, pp. 6025-6043, (2008).

Huang, B.; Wang, W.; Bates, M. and Zhuang, X., "Three-Dimensional Super-Resolution Imaging by Stochastic Optical Resonstruction Microscopy," Science, vol. 319, p. 810, (2008).

Pavani, S. R. P. and Piestun, R., "Three Dimensional Tracking of Fluorescent Microparticles Using a Photon-Limited Double-Helix Response System," Opt. Express, vol. 16, No. 26, (2008).

Sun, Y.; McKenna, J. D.; Murray, J. M.; Ostap, E. M. and Goldman, Y. E., "Parallax: High Accuracy Three-Dimensional Single Molecule Tracking Using Split Images," Nano Lett. 9, pp. 2676-2682, (2009).

Shtengel, G.; Galbraith, J. A.; Galbraith, C. G.; Lippincott-Schwartz, J.; Gillette, J. M.; Manley, S.; Sougrat, R.; Waterman, C. M.; Kanchanawong, P.; Davidson, M. W.; Fetter, R. D. and Hess, H. F., "Interferometric Fluorescent Super-Resolution Microscopy Resolves 3D Cellular Ultrastructure," Proc. Natl. Acad. Sci. USA 106, 3125 (2009).

Piestun, Univ. of Colorado and published in S. R. P. Pavani, M. A. Thompson, J. S. Biteen, S. J. Lord, N. Liu, R. J. Twieg, R. Piestun, and W. E. Moerner, "Three-Dimensional Single-Molecule Fluorescence Imaging Beyond the Diffraction Limit Using a Double-Helix Point Spread Function," Proc. Nat. Acad. Sci. (USA) 106, 2995-2999 (published online, Feb. 11, 2009).

Tang, J.; Akerboom, J.; Vaziri, A.; Looger, L. L. and Shank, C. V., "Near-Isotropic 3D Optical Nanoscopy with Photon-Limited Chromophores," Proc. Natl. Acad. Sci. USA 107, pp. 10068-10073, (2010).

Badieirostami, M.; Lew, M. D.; Thompson, M. A. and Moerner, W. E., "Three-Dimensional Localization Precision of the Double-Helix Point Spread Function Versus Astigmatism and Biplane," Appl. Phys. Lett. 97, 161103, (2010).

Thompson, M. A.; Lew, M. D.; Badieirostami, M. and Moerner, W. E., "Localizing and Tracking Single Nanoscale Emitters in Three Dimensions with High Spatio-Temporal Resolution Using a Double-Helix Point Spread Function," Nano Lett. 10, pp. 211-218, (2010).

\* cited by examiner

1305

APPARATUS AND METHOD FOR LOCALIZING OBJECTS FOR DISTANCE AND/OR IN THREE DIMENSIONS USING A SPIRAL POINT SPREAD FUNCTION

FEDERALLY-SPONSORED RESEARCH AND DEVELOPMENT

This invention was made with Government support under contract GM085437 awarded by the National Institutes of Health. The Government has certain rights in this invention.

BACKGROUND

Conventional microscopes suffer from fundamental diffraction effects that limit the resolution to roughly $\lambda/(2\times NA)$, where $\lambda$ is the optical wavelength and NA the numerical aperture of the imaging system. The numerical aperture (NA) for microscope objectives is at most 1.3-1.6; thus the spatial resolution for optical imaging is limited to around 200 nm for visible light. Images of single nanoscale emitters can be fit to extract the xy position of the object with nanometer precision. This localization precision $\sigma$ scales roughly as $s/N^{1/2}$ for photon-limited shot noise, where s is the standard deviation of the microscope's point spread function (PSF) and N is the number of photons detected. In this way, the location of a point emitter can be determined to a much greater precision than the diffraction-limited resolution of an optical system.

Optical imaging systems take light from a three-dimensional (3D) scene and relay it to another position, where typically a camera, eye, or some other photosensitive element is placed. Conventional imaging systems are designed to create two-dimensional (2D) images of 3D scenes, since nearly all photodetectors are 2D (i.e., flat). Thus, it is difficult to extract 3D information from the 2D images created by conventional imaging systems. The primary reason for this difficulty is that the point spread function (PSF), or the image of a point object emitting light, of a conventional imaging system does not vary appreciably as the object moves along the axial direction (closer or father away). Since the conventional PSF does not change very much as an object moves, the conventional PSF does not contain sufficient information about the axial (z) location of an object.

SUMMARY

Various example embodiments of the present disclosure are directed toward methods, systems, and apparatus that include an optical detection node to pass light through the optical pathway to the optical detection node where the light is detectable. At least one focusing element is configured to pass the light along the optical pathway. Further, at least one optical mask is used to provide spatially-varying modulation on the light passing along the optical pathway. The light passing along the optical pathway is redirected and modified to create a spiral point spread function at the optical detection node for estimating a distance to an object that is characterized at least in part by the light passing along the optical pathway.

Additionally, certain aspects of the instant disclosure are directed towards corkscrew-like point spread function (PSF). This type of PSF (also referred to as spiral or spiral-like) is capable of operating with both scattering and fluorescent point objects, and enables an emission pattern which causes the light from nanoscale point objects to follow a corkscrew/spiral shape in three-dimensional space. The PSF enables the estimation of a position and tracking of nanoscale objects in three-dimensional space with nanometer precision while utilizing a limited numbers of photons. A PSF, in accordance with the instant disclosure, can be applied with widefield uniform illumination to localize multiple objects simultaneously in three dimensions. Additionally, a PSF, in accordance with the instant disclosure, can be used with confocal illumination and detection to localize objects in x, y, and z in small volumes at fast frame rates.

The above discussion/summary is not intended to describe each embodiment or every implementation of the present disclosure. The figures and detailed description that follow also exemplify various embodiments.

Figure 1A:
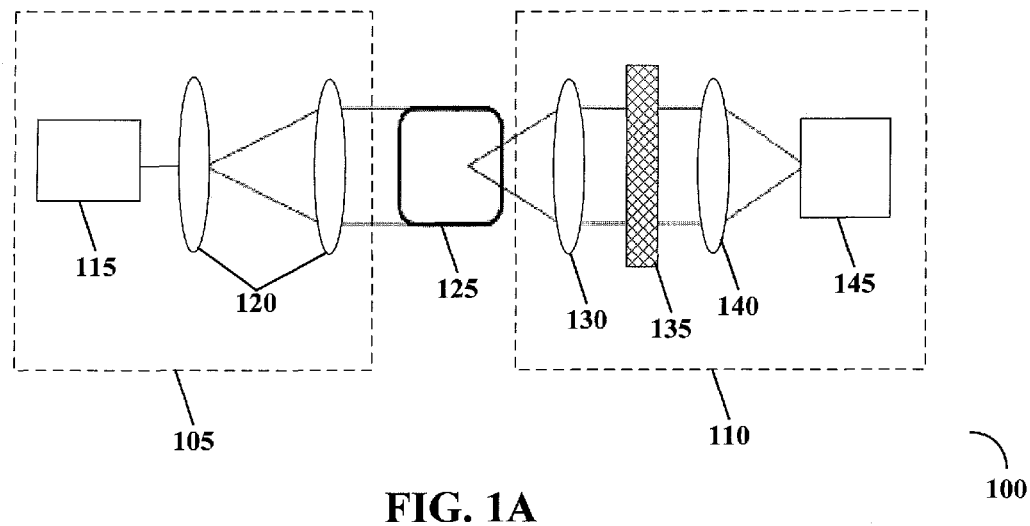
FIGS. 1A and 1B show block diagrams of example embodiments of the invention, one for general imaging (FIG. 1A) and one for microscopy (FIG. 1B)

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

The following description of the preferred embodiments of the invention is not intended to limit the invention to these preferred embodiments, but rather to enable any person skilled in the art to make and use this invention.

Aspects of the present disclosure are directed toward a corkscrew/spiral (also referred to as corkscrew-like or spiral-like) point spread function (PSF) by breaking the symmetry in objects above and below the focal plane, and increasing the change in the PSF in all three dimensions. With this type of PSF, the light emitted from a nanoscale object follows a corkscrew path in three-dimensional space. A camera can capture a two-dimensional transverse slice of this PSF. Thus, the image of an object with the corkscrew PSF is characterized by a single spot. This spot revolves around the center rotation axis of the corkscrew as a function of the axial position of the emitter. Thus, the axial position of the object can be estimated from the angle of a line connecting the spot and the center of rotation.

Certain aspects of the instant disclosure are directed towards apparatuses having an optical pathway for passing light. Example embodiments of an apparatus having an optical pathway for passing light include an input optical detection node designed such that light passes through the optical pathway to a second optical detection node where the light is detectable. Apparatus also include at least one optical lens or focusing element placed along the optical pathway. Further, example apparatuses include at least one optical mask designed to provide spatially-varying modulation on the light passing along the optical pathway. The light passing along the optical pathway is redirected and modified to create a spiral (e.g., corkscrew, helical) point spread function at the optical detection node for estimating a distance to an object that is characterized at least in part by the light passing along the optical pathway.

Specific embodiments of an apparatus consistent with the instant disclosure additionally include an optical detector, placed at optical detection node, and a microscope, configured and arranged between the object and an image plane of the optical pathway, for presenting images to the optical pathway. Additionally, certain apparatuses additionally include a light source for presenting light to the optical pathway. One or more optical lenses and at least one optical mask can be arranged as an optical Fourier processor.

Additionally, in certain embodiments of the disclosure, an apparatus can also include an optical detector located at optical detection node, which is designed to present detected signals to a detected-signal processing circuit. An apparatus can also include a detected-signal processing circuit designed to process signals detected by the optical detector for three-dimensional depth determination, tracking of a single nanoscale emitter, and/or deconvolution of an image.

In example embodiments of an apparatus having an optical pathway for passing light, consistent with the instant disclosure, the phase mask of the apparatus can be located between two optical lenses, which are each respectively separated by a focal length. The phase mask, in example embodiments of the apparatus having an optical pathway for passing light, facilitates or defines the spiral point spread function with sufficient accuracy to resolve emitters over a depth of field greater than one (1) micron.

Certain example embodiments of the instant disclosure can include an apparatus having a detected-signal processing circuit that is configured and arranged to process signals detected by the optical detector, wherein the spiral point spread function provides data at the optical detection node for providing data-signal processing of a widefield imaging mode and a confocal imaging mode.

Additional aspects of the instant disclosure are directed towards a microscope interface, designed to secure an apparatus, having an optical pathway for passing light (as described in detail above), to a microscope at or near an image plane of the optical pathway of the apparatus. Such a microscope interface is designed for securing the apparatus to the microscope removably by interlocking the apparatus with the microscope at the microscope interface. The microscope interface provides an alignment mechanism configured and arranged for re-alignment between the apparatus and the microscope while preserving the spiral point spread function.

Further aspects of the instant disclosure are directed towards a camera interface, designed to secure an apparatus, having an optical pathway for passing light (as described in detail above), to a camera at or near an image plane of the optical pathway of the apparatus. Such a camera interface is designed for securing the apparatus to the camera removably by interlocking the apparatus with the camera at the camera interface. The camera interface provides an alignment mechanism configured and arranged for re-alignment between the apparatus and the camera while preserving the spiral point spread function.

Further embodiments of an apparatus having an optical pathway for passing light additionally include a computer program comprising computer executable instructions, the instructions being adapted to process signals detected by the optical detector, wherein the spiral point spread function provides data at the optical detection node for providing data-signal processing of a widefield imaging mode and a confocal imaging mode.

The instant disclosure is also directed towards a method for passing light along an optical pathway. The method includes providing at least one optical lens or focusing element and at least one optical mask in the optical pathway, and passing light through the optical pathway to an optical detection node where the light is detectable. The light is redirected and modified to create a spiral point spread function at the optical detection node for estimating a distance to an object that is characterized at least in part by the light passing along the optical pathway.

Additionally, the instant disclosure is directed towards a method of manufacturing. The method includes creating a pattern and therein providing an optical mask useful in creating a spiral point spread function when used in combination with at least one lens in an optical convolver. In other embodiments of methods of manufacturing, the method includes additional steps of designing the pattern to represent the spiral point spread function and placing the mask in the optical convolver.

Certain specific aspects of the present disclosure are directed towards a storage medium, operating alone or with various apparatus discussed in the present disclosure, which includes a computer program having computer executable instructions that are adapted to process signals detected by the optical detector. The spiral point spread function provides data at the optical detection node for providing data-signal processing of a widefield imaging mode or a confocal imaging mode.

Further, certain embodiments of the present disclosure are directed towards methods. The methods include an initial estimation made for the phase mask. A phase-only mask is enforced, and a spiral point spread function behavior is computed. Subsequently, the behavior of the spiral point function is checked to determine if it is satisfactory, and if the behavior is satisfactory, the desired images of the spiral point spread function are enforced. In response thereto, a resulting mask is computed, desired GL modes are enforced, and the phase mask is saved.

Additionally, various aspects of the present disclosure are directed towards methods that include illuminating a set of well-separated point source(s). A spiral point spread function image of the source(s) is captured, and an x-y (2-Dimensional) position of the source(s) is determined. The angle(s) between the spiral point spread function images of the source(s) with respect to each center of rotation is measured, and subsequently, the angle(s) are converted to a z-position(s).

Various aspects of the present disclosure are also directed towards assortment of articles for assembly. The set of articles include at least one optical lens configured for placement along an optical pathway. Additionally, the articles also include at least one optical mask that provides spatially-varying modulation on light passing along the optical pathway. The light passing along the optical pathway is redirected and modified to create a spiral point spread function at an optical detection node for estimating a distance to an object that is characterized at least in part by the light passing along the optical pathway.

Further aspects of the present disclosure are directed towards apparatus that include at least one optical mask that provides spatially-varying modulation on light passing along an optical pathway. The light passed is redirected and modified to create a spiral point spread function at an optical detection node for estimating a distance to an object that is characterized at least in part by the light passing along the optical pathway.

Because the rotation angle of a corkscrew PSF cannot be estimated without knowing the position of the center axis, two images of the corkscrew can be collected: one with the mask in its normal orientation and the other with the mask revolved 180 degrees about its center, which is easily accomplished by revolving a mask produced by a programmable phase modulator (spatial light modulator) or a second phase mask. Then, the position of the center of rotation can be estimated from the midpoint between the two measured locations of the corkscrew PSF.

Shown in FIG. 1A is an apparatus of an example embodiment consistent with the instant disclosure. Aspects of the instant disclosure are directed towards apparatuses for depth (or distance) assessment and/or three-dimensional (3D) imaging utilizing a corkscrew point spread function (PSF). In certain embodiments, the apparatus 100 consists of an illumination section 105, a 3D object 125 (that is to be imaged), and an imaging section 110. The illumination section 105 contains a light source 115 and focuses elements 120 (e.g., lenses) needed to illuminate the 3D object. The light, after interacting with the object, is captured by the imaging section, which contains focuses elements 130 and 140 to focus the light onto a detector 140. The mask 135 is placed in the back focal plane of focuses element 130 and input focal plane of a focuses element 140. The mask, which may have amplitude and phase components, represents the inverse Fourier transform of the corkscrew PSF. Once implemented, an apparatus, consistent with that shown in FIG. 1A, can be used to accomplish 3-D imaging of a scene.

Figure 8:
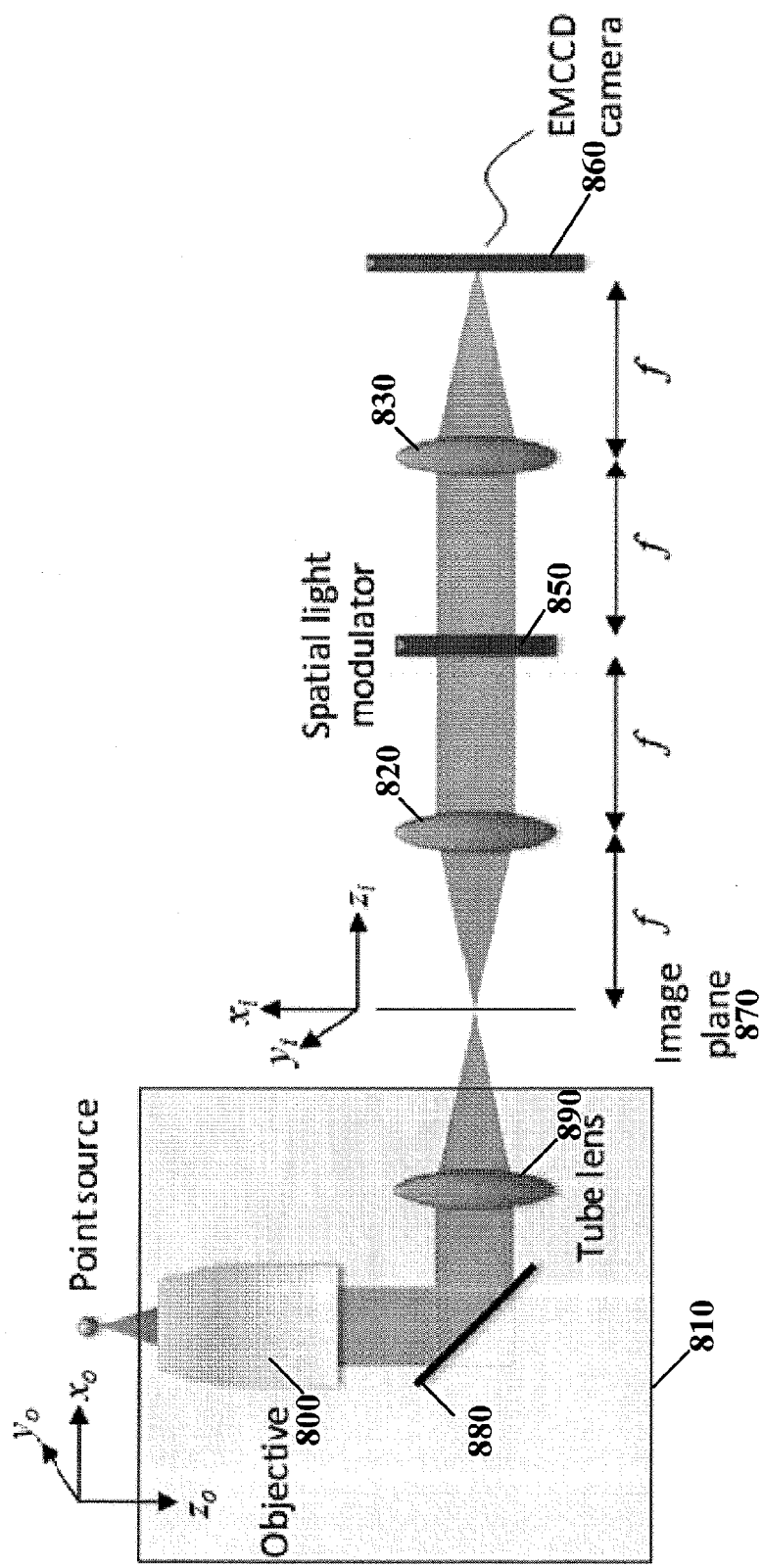
FIG. 8 shows an example embodiment of an arrangement that can be implemented with a microscope to create a corkscrew point spread function in accordance with the instant disclosure.

In certain embodiments, the instant disclosure is additionally directed towards an arrangement that can be adapted to a conventional microscope for use by scientists to obtain 3-D information from samples in their laboratories. Such an apparatus is shown in FIG. 8, and described below in further detail.

The illumination section 105 in an example embodiment includes a coherent light source 115. The coherent light source may include, for example, an Argon ion laser operating at 488 or 514 nm, or a diode laser emitting at 532 nm or 641 nm. Other lasers operating at various wavelengths may also be used as sources of coherent light. The light source may produce monochromatic or polychromatic light. The focuses elements 120 expand or reduce the laser beam so that it illuminates a region of interest of the object 125. These focuses elements may also be supplemented by polarizers, waveplates, or diffusers in order to manipulate the polarization or coherency of the light illuminating the object. Other illumination sections that produce incoherent light, such as an arc lamp, may also be used.

Additionally, the apparatus shown in FIG. 1A can have an imaging section 110, which contains two focuses elements 130/140 that focus light from the object onto a detector 145. The focuses elements may comprise, for example, coated achromatic lenses with 150 mm focal length and an aperture of 50 mm. However, these focuses elements may be of different focal lengths in order to accomplish beam expansion or reduction. Various other lenses or optical components may also be included in order to focus light from the object onto the detector.

The imaging section also includes a mask 135 placed in between the two focuses elements 130/140 The mask 135 is positioned in the Fourier plane of the imaging section 110 in the embodiment shown in FIG. 1A. The mask, in accordance with the instant disclosure, can also serve the imaging functions of focuses elements 130/140. The mask is, e.g., a phase mask, and as contemplated in other embodiments, a hologram, a computer-generated hologram, a diffractive optical element, a volume optical element, or the like. The mask may have one or both of amplitude and phase components. The mask may be static or dynamic, based upon the scene being imaged, system requirements, or user requirements. The mask may be implemented with a spatial light modulator which manipulates the phase and/or the amplitude of the light. Examples of such masks include those constructed from liquid crystals or from micro-electromechanical systems. Further, a physical mask can also be fabricated, for example, by electron beam lithography, proportional reactive ion etching in $SiO_2$, hot embossing in PMMA, gray level lithography, multistep photolithography, or direct laser writing.

Figure 1B:
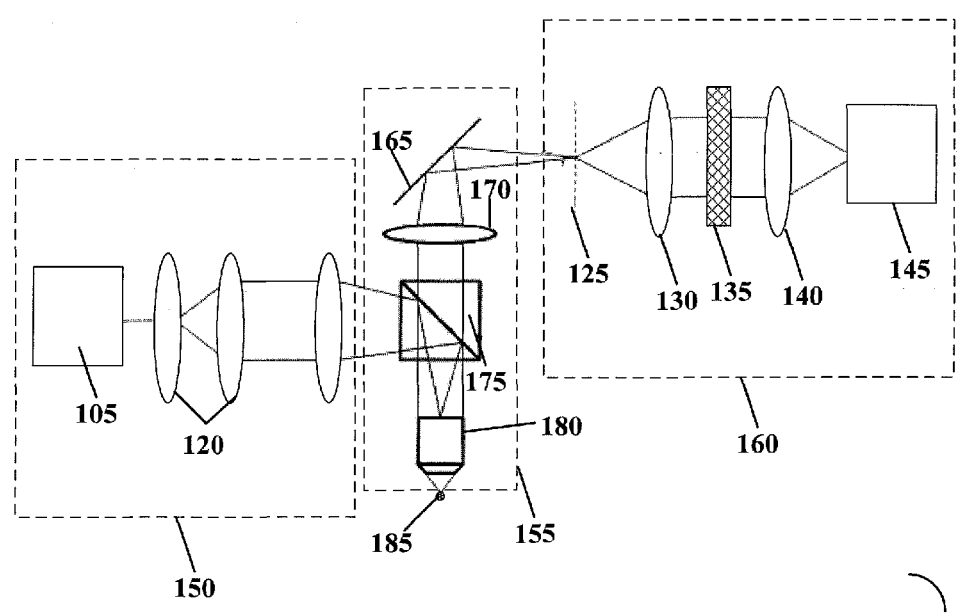

FIG. 1B shows another example embodiment consistent with the instant disclosure. FIG. 1B shows an optical imaging arrangement 190. Embodiments consistent with the optical arrangement shown in FIG. 1B images the object in reflection mode rather than transmission mode. Turning now to FIG. 1B, object 185 is illuminated with an illumination section 150. The microscope section 155 relays an image of the object to an intermediate image plane 125, and the imaging section 160 relays this image onto a detector 145. The illumination section 150 can include a coherent or incoherent light source, polarization, or diffusing optical elements, similar to illumination section of the apparatus discussed with reference to FIG. 1A. The illumination section 150 may also include any number of focuses elements to focus the illumination light as necessary into the microscope section 155. The microscope section 155 includes a beamsplitter 175, an objective lens 180, a tube lens 170, and a mirror 165 in the embodiment shown. This section can additionally include interference filters, pinholes, or polarization optics for specialized modes of microscopy (e.g., fluorescence, confocal, or differential interference contrast microscopy). The imaging section 160, similar to the imaging system shown in FIG. 1A, includes focuses elements 130/140, a mask 135, and a detector 145. In addition, the functions of the microscope section 155 and imaging section 160 can be combined into a single module.

Another strategy for using a corkscrew PSF, consistent with various embodiments of the present disclosure, is to utilize a spatially patterned excitation light (such as that used in Stimulated Emission Depletion (STED) microscopy or Reversible Saturable Optical Fluorescence Transitions (RESOLFT) microscopy) to spatially confine the fluorescence at the sample (185) in the lateral (xy) direction. This specially patterned excitation light could be generated using an apparatus such as the illumination section 150 shown in FIG. 1B, (e.g., a spiral or vortex phase mask). The corkscrew PSF would then be used in the detection path of the microscope (160) to infer the z position of the emitted fluorescence. A small array of fast, sensitive detectors (145), such as an avalanche photodiodes (APDs) can be used, enabling 3D position readout of fluorescent samples.

Figure 2A:
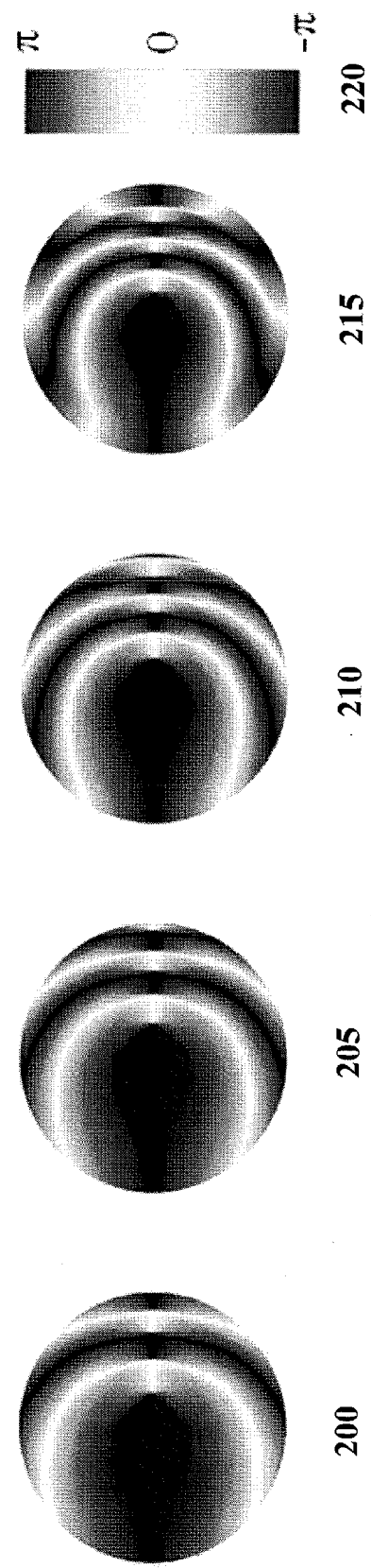
FIG. 2A shows various phase masks, in accordance with an example embodiments of the instant disclosure, that generate the corkscrew PSF used in combination with various apparatuses, methods, and arrangement of the instant disclosure.

There are numerous variations of the corkscrew PSF, and multiple ways of implementing those variations. Accordingly, all variations of the corkscrew PSF can be implemented in each of the discussed embodiments of the various apparatuses, arrangements, system and methods consistent with the instant disclosure. For example, one may use any of the phase masks shown in FIG. 2A as the mask 135. FIG. 2A shows four different variations (200/205/210/215) of a corkscrew PSF phase mask. The gray scale shown in each different variation (200/205/210/215) corresponds to the angle key 220, which shows the optical thickness or phase delay of the phase mask from $-\pi$ to $\pi$.

Fisher information (FI) calculations indicate that corkscrew PSF, consistent with various aspects of the present disclosure, achieve nanometer precision in all three dimensions with a limited number of photons. This is demonstrated by imaging fluorescent beads on a triangular polydimethylsiloxane (PDMS) grating. Experiments to show such imaging were carried out using, for example, an inverted epifluorescence microscope (e.g., Olympus IX71, Japan) that is convolved with the corkscrew PSF using a 4f optical processing section, including a reflective phase-only spatial light modulator (e.g., SLM, Boulder Nonlinear Systems 512×512 XY Phase series, USA) in the Fourier plane that is loaded with the phase mask corresponding to the corkscrew PSF. Such an arrangement is shown in FIG. 8, and discussed in detail below.

To demonstrate 3D imaging, 0.2 μm diameter fluorescent beads emitting at 645 nm were excited with a 641 nm laser (e.g., Coherent CUBE 640-100C, USA) and collected the fluorescence through a 100×1.4 NA oil-immersion objective (e.g., Olympus UPlanSApo 100×=1.40), dichroic beam splitter (e.g., Semrock Di01-R635-25×36, USA), and longpass filter (e.g., Omega Optical 650AELP, USA). A piezoelectric objective lens positioner (e.g., Physik Instrumente PIFOC, Germany) was used to axially scan a sample of beads spin-coated on a glass coverslip. A drop of immersion oil (n=1:518) was added to the top surface of the sample to prevent aberrations. The fluorescence can be detected with an electron-multiplying charge-coupled Si camera (e.g., Andor iXon+ DU-897, UK).

Figure 2B:
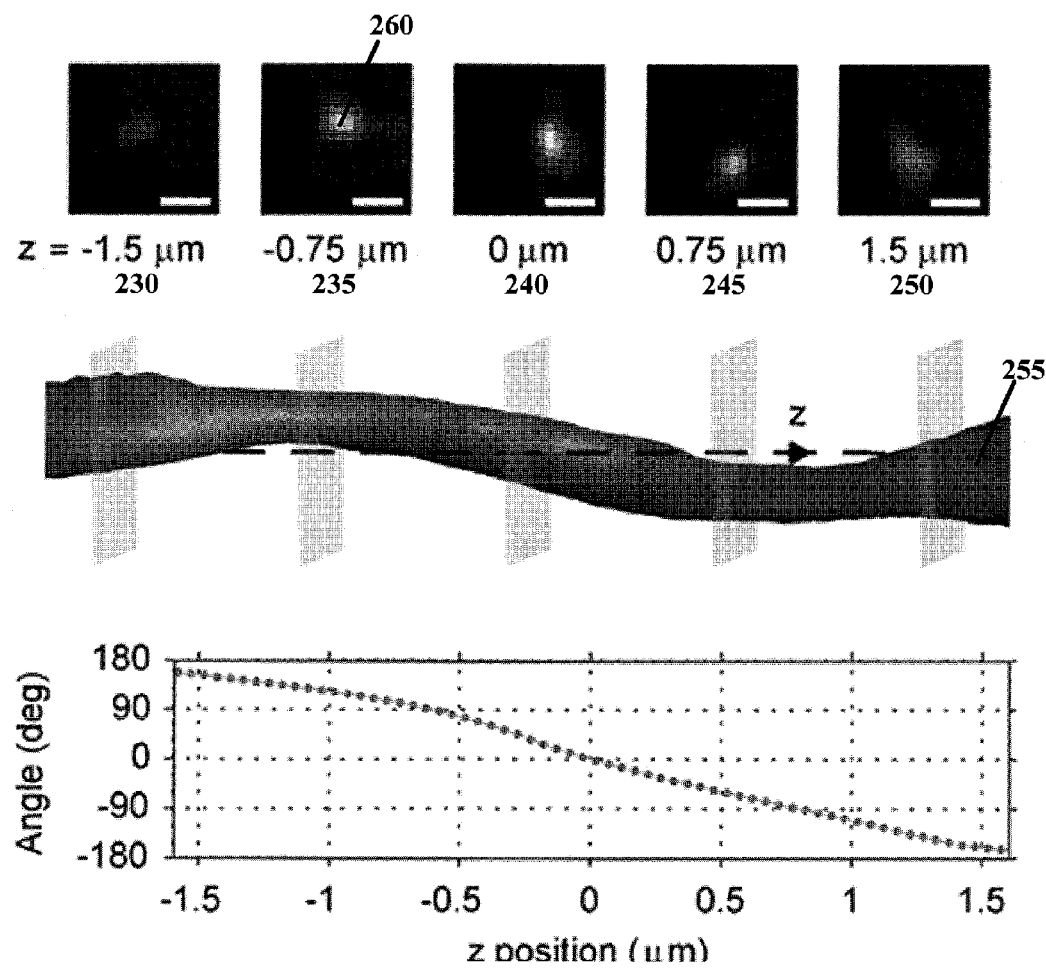
FIG. 2B shows an example embodiment of the corkscrew point spread function (PSF) for various values of axial position (z) in accordance the instant disclosure.

Using a corkscrew PSF phase mask, for example one of the variations (200/205/210/215) shown in FIG. 2A, a corkscrew PSF is created with a behavior shown in FIG. 2B. The five images (230, 235, 240, 245, 250) in FIG. 2B show the appearance at the detector 145 of a single fluorescent bead 260 located at several axial (z) positions. The five images (230, 235, 240, 245, 250) show the rotating effect of the corkscrew PSF, as the position of the single fluorescent bead 260 in each of the images (230, 235, 240, 245, 250) is at a different position.

The corkscrew PSF shown in FIG. 2B revolves 330 degrees through a 3.2 μm depth range. The general three-dimensional behavior 255 of a corkscrew PSF is shown below the five images (230, 235, 240, 245, 250) in FIG. 2B to illustrate the revolution of the corkscrew function around the z-axis. The corkscrew PSF (255) smoothly rotates as a function of the axial (z) position of the emitter of interest and forms the shape of a corkscrew in 3D space, whose axis of rotation is centered at the transverse (xy) location of the emitter. In order to localize this axis, two images are sequentially collected for each object; the first uses the normal corkscrew PSF, and the second uses a version that has been rotated by 180 degrees, performed by rotating the phase mask on the SLM. Consequently, the spot in the second image will be rotated 180 degrees with respect to the corkscrew's axis of rotation; hence the center between the two spots is the xy location of the emitter. The angle of the line through the two spots relative to a reference line determines the z location of the emitter. Each spot is fit to a symmetric Gaussian function in order to determine its position. A calibration curve of the rotation angle, the graph shown in FIG. 2B, versus z position was created by axially scanning a fluorescent bead in precise 50 nm steps.

The corkscrew PSF may be implemented using a combination amplitude and phase mask that contains the Gauss-Laguerre (GL) modes (m,n) equal to (1,1), (2,4), (3,7), and (4,10). Fewer or additional modes along the line formed by these modes in the GL modal plane can be used to create different embodiments of the corkscrew PSF, depending on the desired application. This corkscrew PSF implementation with this type of mask would have an infinite depth range, as this superposition of GL modes forms a perfect rotating PSF.

Figure 3:
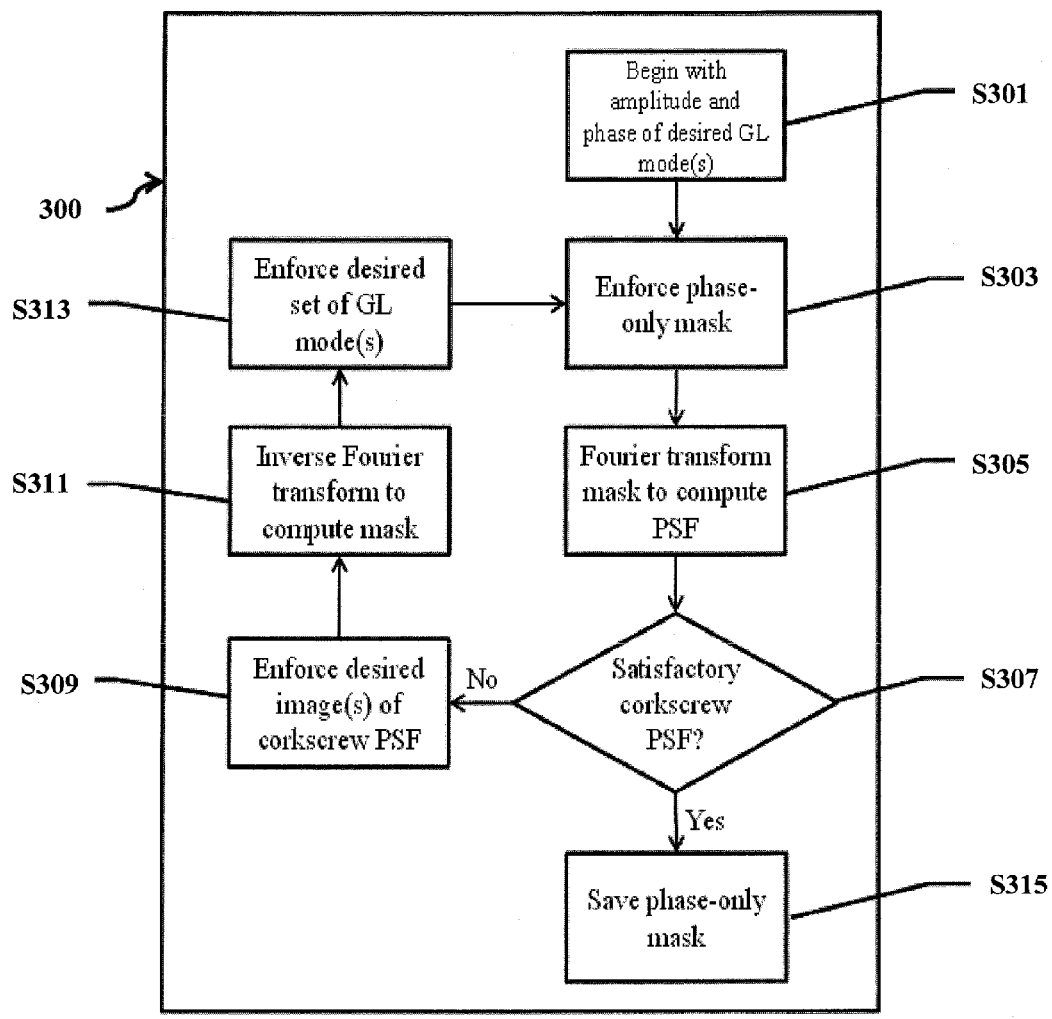
FIG. 3 shows a flowchart of a method for designing a high-efficiency phase mask that can create the corkscrew PSF in accordance with example embodiments of the instant disclosure.

An example embodiment of a method, in accordance with the instant disclosure, is depicted in flowchart 300 in FIG. 3. This method includes making an initial estimation for the phase mask S301, enforcing a phase-only mask S303, computing the PSF behavior S305, and checking if the PSF is satisfactory S307, enforcing the desired images of the PSF S309, computing the resulting mask S311, enforcing the desired GL mode(s) S313, and finally saving the phase mask S315. Specific embodiments of methods of the instant disclosure can be performed by a computer with numerical computation software. In other specific embodiments, methods of the instant disclosure can be performed by dedicated computation hardware.

Turning again to the example method shown in FIG. 3, step S301 functions to make an initial guess for the phase mask design. In the certain embodiments, the aforementioned superposition of GL modes is used for this guess. In another embodiment of the invention, a random phase mask can be used. Step S303 functions to enforce a phase-only mask, for example, by replacement of the amplitude portion by transparency with no absorption or optical loss. This increases the photon efficiency of the mask creating the corkscrew PSF, which is desirable for many applications.

Step S305 functions to simulate the resulting PSF from the phase-only mask computed in step S303. In certain embodiments, this step assumes a perfect Fourier transform operation for the imaging lenses. In other embodiments, a more sophisticated propagation algorithm can be used. Suitable aberration effects may be added to this calculation to better simulate the PSF created from the phase mask.

Step S307 functions to check if the resulting PSF is satisfactory. This check can be performed by simulating images of the PSF as a function of axial position. In certain embodiments, the size, rotation rate, photon efficiency, diffraction efficiency, and the depth of field of the PSF are all evaluated to decide if the PSF is satisfactory. In other embodiments, the PSF can be compared with the previous iteration of the PSF to determine if significant changes have occurred to judge if the PSF is satisfactory. Moreover, in another specific embodiment, the number of iterations of this algorithm can simply be a fixed number, and the PSF is judged satisfactory once this number of iterations has been reached. If the PSF is judged to be satisfactory, step S315 follows. Otherwise, step S309 will be performed.

Step S309 functions to enforce the desired characteristics of the corkscrew PSF. The desired intensity can be enforced in multiple z planes, while the calculated phase is retained. In other embodiments, the desired phase is enforced while the amplitude is retained. However, in another specific embodiment, the rotation rate, size, or efficiency of the PSF is enforced, while the other parameters are unmodified.

Step S311 functions to calculate the mask that generates the desired PSF. An inverse Fourier transform can be used to perform this calculation. Alternatively, more sophisticated propagation calculation can be performed. Similar to step S305, any suitable aberration effects can also be added to this calculation. S313 functions to enforce the GL modes of the phase mask to be near the desired set of modes. This ensures that the PSF will revolve over a significant depth of field. A Gaussian function can be used to emphasize the modes near the desired set of modes. In certain embodiments of methods consistent with the instant disclosure, this step can be skipped and the desired PSF rotation can be enforced in step S309. Step S303 can be repeated, thereby completing an iteration of the method.

Figure 4:
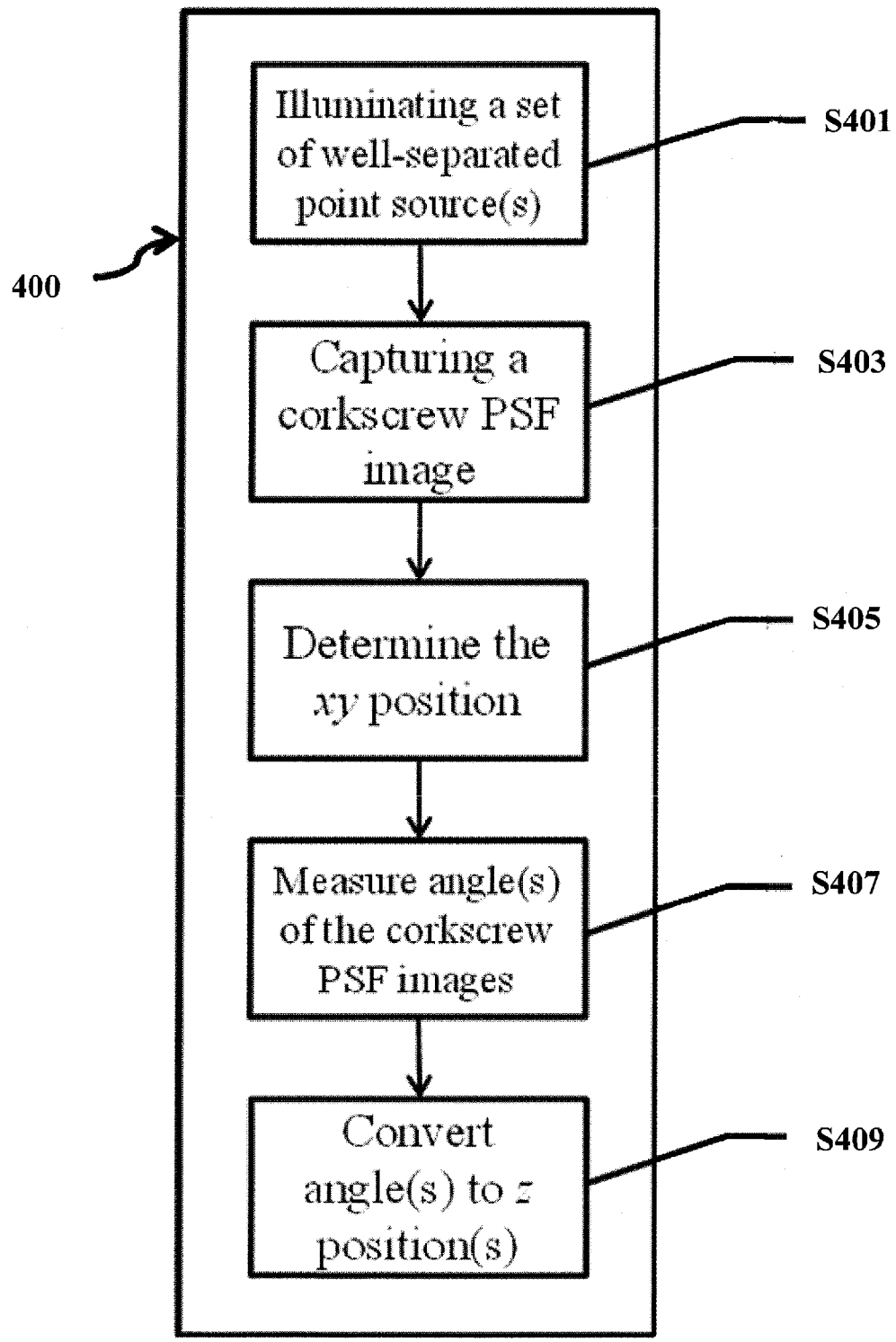
FIG. 4 shows a flowchart of a method for determining the three-dimensional location of an object or set of objects using a corkscrew PSF according to an example embodiment consistent with the instant disclosure.

FIG. 4 shows an example embodiment of a method 400 for extracting 3D localization information from images of the corkscrew PSF. Methods, consistent with the method shown in FIG. 4, includes illuminating a set of well-separated point source(s) S401, capturing a corkscrew PSF image of those source(s) S403, determining the xy position of those source(s) S405, measuring the angle(s) of the corkscrew PSF images of those source(s) S407, and converting angle(s) to z position(s) for those source(s) S409. This method can be performed using an array photodetector and digital computer with numerical computation software. Alternatively, the algorithm can be performed by dedicated computation hardware. In another embodiment, overlapping point sources of light can be imaged; however, deconvolution is necessary to extract the 3D location of each source.

Step S401 functions to illuminate a set of well-separated point sources. If the concentration of point sources is too high, photoactivation, photo switching, or chemically-induced blinking of the point sources can be utilized to lower the concentration. In another embodiment, a complex 3D scene can be illuminated. The illumination can be coherent, such as illumination from a laser, or it can be incoherent.

Step S403 functions to capture an image of the illuminated sample or scene. Multiple images are required to extract the center rotation axis of the corkscrew PSF for each point source. The preferred embodiment involves using two phase masks to capture two images, one at a normal orientation and one revolved 180 degrees about the optical axis. The combination of the two images, for example, the summation of the two images, contains two spots for each point source, and the midpoint of the spots gives the lateral position of the point source. These two images can be recorded sequentially or simultaneously.

Step S405 functions to calculate the lateral (xy) position of the point sources. A nonlinear least squares algorithm can be used to fit each spot to a 2D Gaussian function in the preferred embodiment. The mean of the Gaussian function can then be used to determine the center xy-location of each spot. Alternatively, a centroid, maximum likelihood, or Bayesian estimation algorithm can be used to determine the center location of each spot. Once the location of each spot is found, the midpoint between pairs of spots corresponding to the same object can be calculated, yielding the lateral position of that object.

Step S407 functions to measure the angle of the corkscrew PSF images. The angle is measured by creating a line between the two pairs of spots from step S405 corresponding to the same object and measuring its angle relative to some reference line. After this computation is performed, step S409 is performed. Step S409 functions to estimate the z-position of the point sources, thereby completing the measurement of 3D location of all the objects of interest. Angles calculated in the previous step are converted to z positions using a calibration curve, similar to that shown in FIG. 2B. This conversion can be accomplished by inputting angles into a spline interpolation of the calibration curve. In another embodiment, a polynomial fit of the calibration curve can be used to calculate z position. Due to the one-to-one correspondence of the rotation angle of the spot in the image and the z-position of the object, the rotation angle encodes the z-position of the object. This step completes the estimation of 3D position of each object of interest.

A microscope embodiment, consistent with the instant disclosure, is used to examine a set of single molecules or point sources that are labeling a 3D biological sample or inorganic sample of interest. One of the masks shown in FIG. 2A can be used for this application. The 3D location of each single molecule or point source labels can be determined in series using the method S400.

Figure 5A:
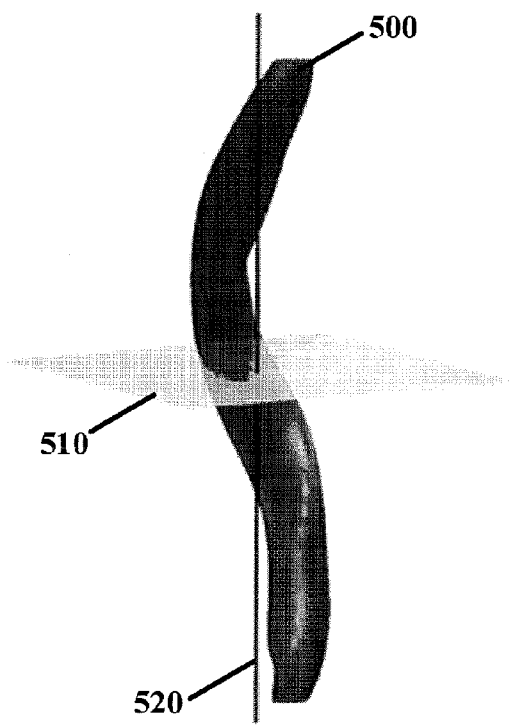
FIG. 5A shows a three-dimensional rending of a corkscrew point spread function in accordance with example embodiments of the instant disclosure.
Figure 5B:
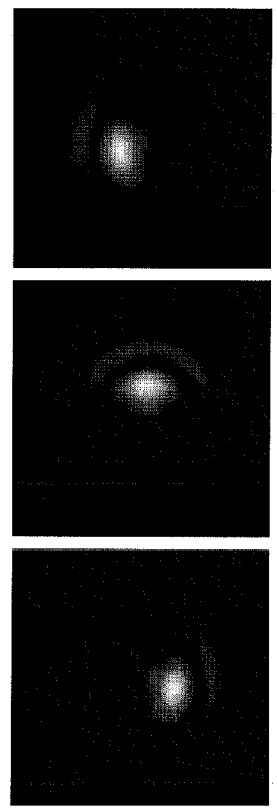
FIG. 5B shows images of a point emitter using the corkscrew point spread function of FIG. 5A.

Turning now to FIG. 5, this figure shows the three-dimensional shape of a corkscrew PSF and resulting images in accordance with an example embodiment. FIG. 5A shows the three-dimensional rendering of a corkscrew PSF 500. The focal plane 510 of the corkscrew PSF 500 and optical (z) axis which defines the center of rotation 520 are included in the three-dimensional rendering for reference. The total length along the z dimension (the vertical axis above) is approximately 2.5 µm. Shown in FIG. 5B are the resulting transverse slices of the corkscrew PSF 500 for z=0.65 µm; z=0 µm; and z=−0.65 µm (from top to bottom).

Figure 6:
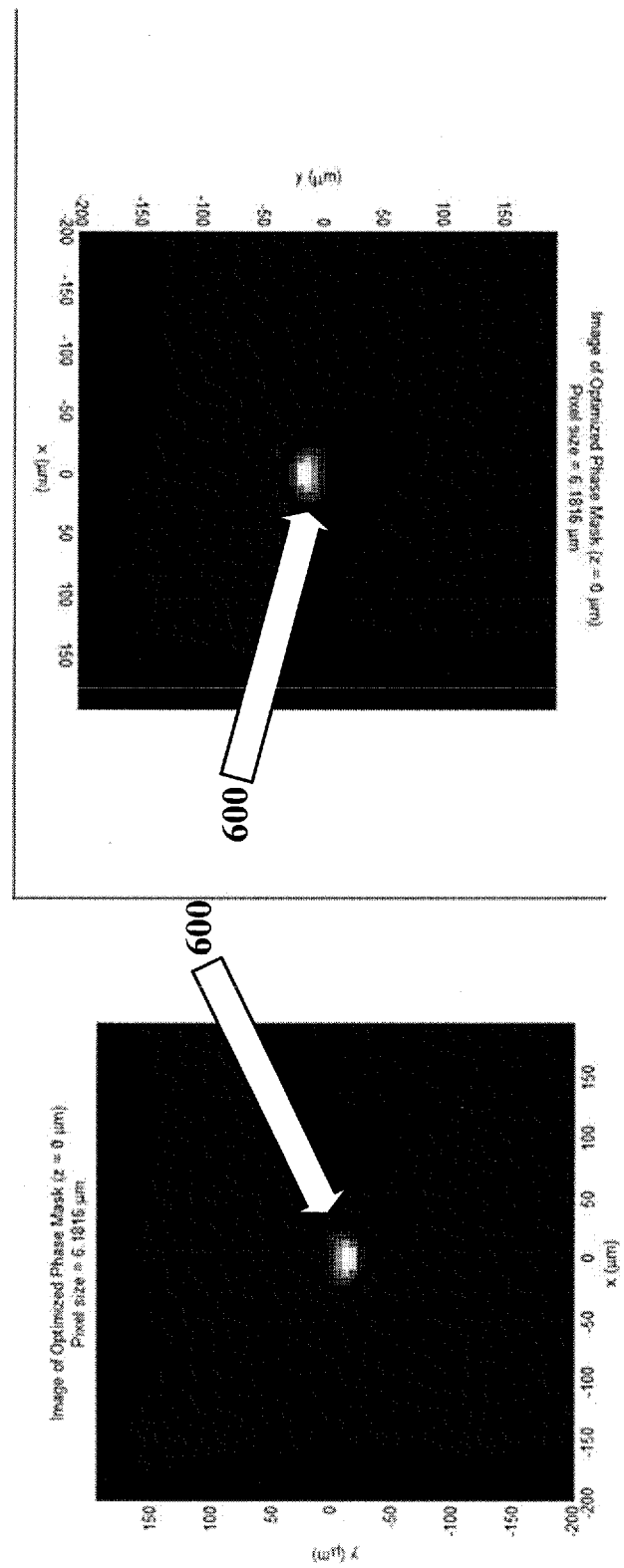
FIG. 6 shows two images of a molecule imaged with a normal mask (left) in accordance with embodiments of the instant disclosure, and an image (right) with a point spread function revolved 180 degrees for use in an acquisition scheme of a corkscrew PSF.

The acquisition scheme of example corkscrew PSFs is shown in FIG. 6 by two images of a molecule sequentially acquired sequentially: a molecule 600 imaged with a normal mask (left) and an image (right) with a point spread function revolved 180 degrees. A Gaussian fitting algorithm is used to find location of a spot in each image, and a nearest neighbors algorithm is used to find corresponding pairs of spots. The midpoint between those two spots yields the xy location, and the angle of the line connecting those two spots yields the z location.

Figure 7:
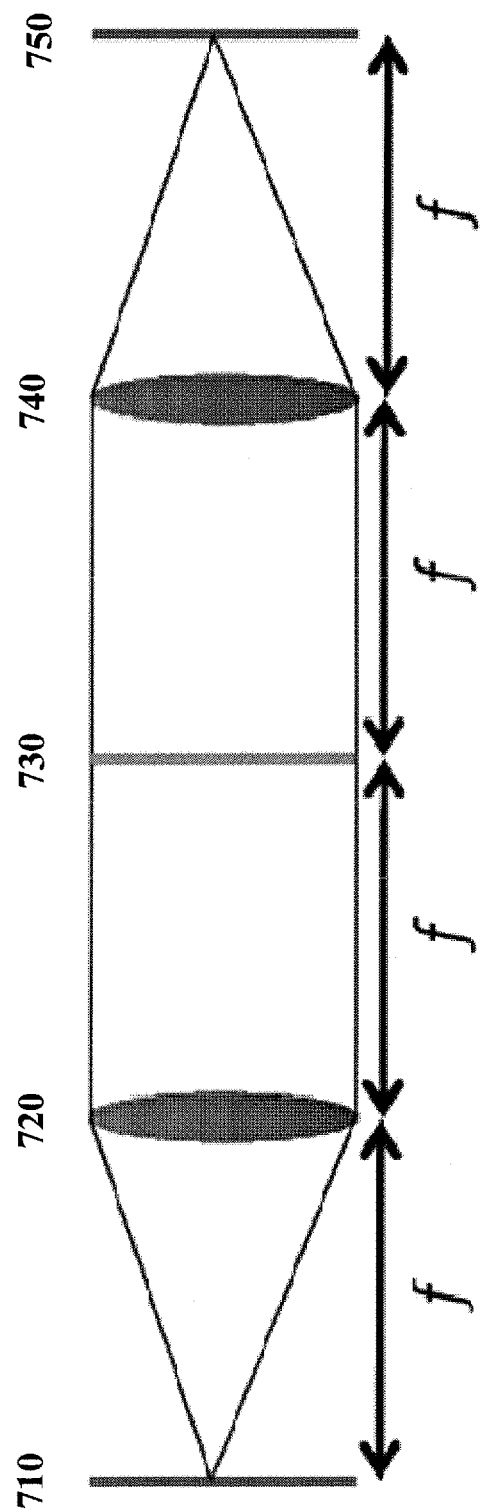
FIG. 7 shows an example embodiment of a 4f imaging system that can create a corkscrew point spread function in accordance with the instant disclosure.

Turning now to FIG. 7, an example implementation of a corkscrew PSF is shown that involves placing a specially designed phase mask in the Fourier plane 730 of a 4f imaging system. The image plane of the conventional microscope is placed at position 710. Lenses 720 and 740 have the same focal length f. For non-unity magnification, the lenses 720 and 740 may have different focal lengths. A phase mask that creates the corkscrew PSF is placed at position 730. The microscope image convolved with the corkscrew PSF is imaged by a camera at position 750. The imaging arrangement shown in FIG. 7 lies between a conventional microscope and a detector. A microscope's image plane is placed at position 710 so that the 4f imaging system convolves the Airy PSF of the microscope with the corkscrew PSF. This convolution is projected onto a detector at position 750. Example implementations consistent with the arrangement shown in FIG. 7 can either be used with widefield (large area) or confocal (focused spot) illumination of the microscope sample. For example embodiments utilizing widefield illumination, the detector can be a large array video sensor, such as an electron-multiplying charge-coupled device (EMCCD) or a low-noise complementary metal-oxide-semiconductor (CMOS) camera. Embodiments of the arrangement having confocal illumination utilize high speed acquisition, because the area of illumination is much smaller, and thus can be accomplished by using a small image sensor at position 750. An example of a small sensors arrangement can include an array of avalanche photodiodes (APDs) with a high fill factor or a fused fiber bundle with each fiber coupled to an APD. In addition, a confocal pinhole can be added to the 4f system at position 710 to filter out fluorescence background emitted from out-of-focus regions of the sample. This would be important if the sample is thick relative to the region of interest.

A corkscrew PSF is based upon a set of Laguerre-Gaussian (LG) modes of the paraxial wave equation whose intensity distribution revolves as it propagates. These modes can be recreated exactly by placing a combined amplitude and phase mask in the Fourier plane of an imaging system, such as the arrangement shown in FIG. 7. However, the amplitude portion of the mask would block a large percentage of photons emitted from the nanoscale object of interest and, thus, would be photon inefficient. A phase-only mask can be used to approximate the desired LG modes with much higher photon efficiency. This phase-only mask is designed by using an iterative optimization algorithm that minimizes the difference between the intensity distribution of the desired LG modes and the PSF generated by the phase mask. While this phase-only mask cannot exactly recreate the behavior exhibited by the desired subset of GL modes, the PSF of the phase mask still revolves in a corkscrew-like fashion over a volume in 3D space (e.g., as shown in FIG. 5A).

Figure 9:
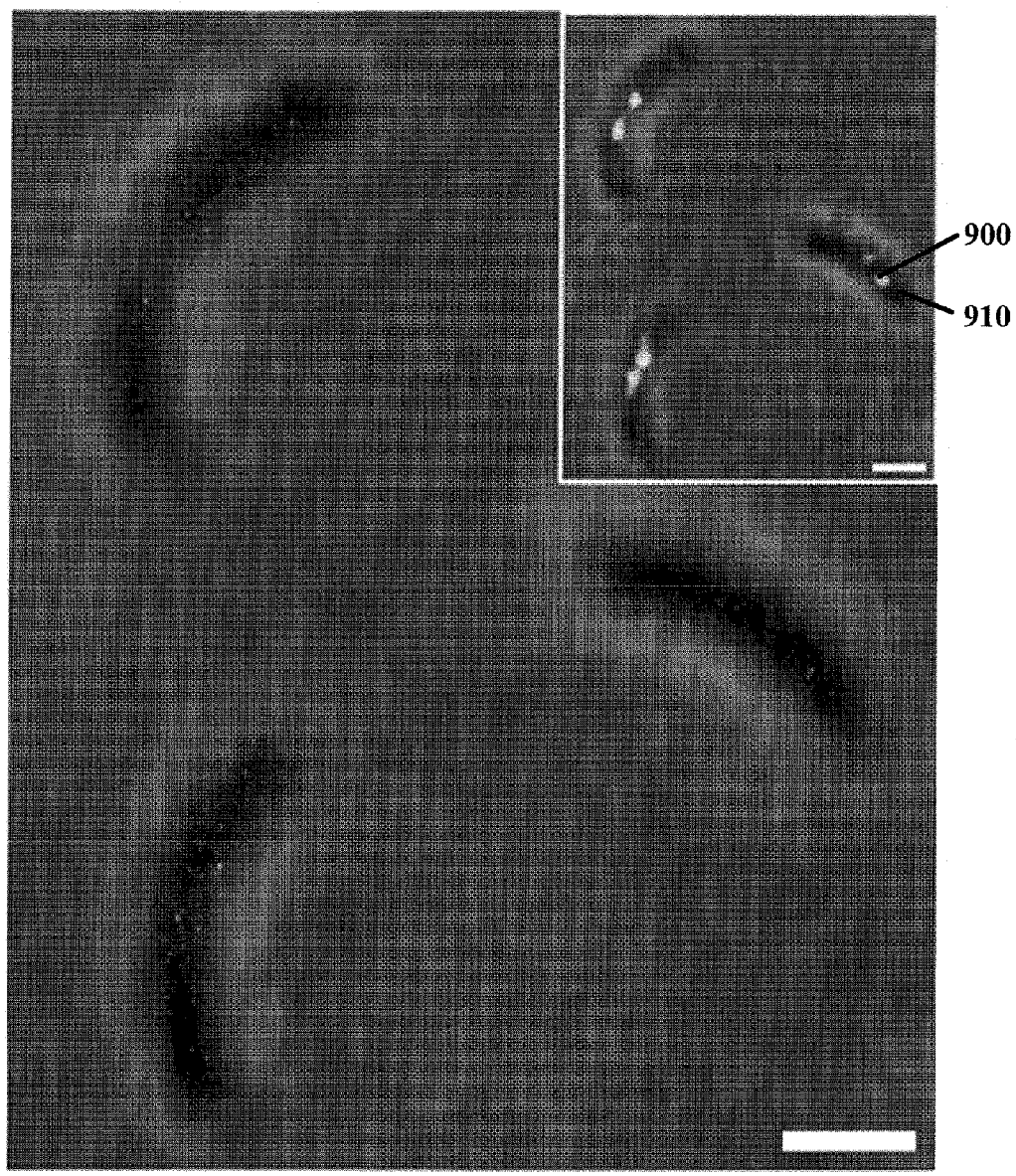
FIG. 9 shows imaging of fluorescently labeled DNA inside bacteria, with a corkscrew point spread function in accordance with an example embodiment of the instant disclosure.

Turning now to FIG. 8, this figure shows an example implementation of a corkscrew PSF with a microscope. FIG. 8 shows an example implementation in two parts: a 4f imaging arrangement 800 and a microscope 810. The image plane 870 of the conventional microscope is shown in the imaging arrangement 800 immediately prior to the microscope 810. The imaging arrangement 800 includes lenses 820/830 (having the same focal length f), and a spatial light modulator 850 (i.e., a mask). An EMCCD camera 860 is also included in the imaging arrangement for capturing the image. The microscope 810 shown in FIG. 8 includes an objective 800 to collect the light of a point source that is to be imaged, a reflecting mirror 880, and a tube lens 890 to refocus the light of the point source at the image plane 860. FIG. 9 shows an example image of a fluorescently labeled DNA 900 within bacteria 910 as imaged by a corkscrew PSF consistent with various aspects of the present disclosure.

Figure 10:
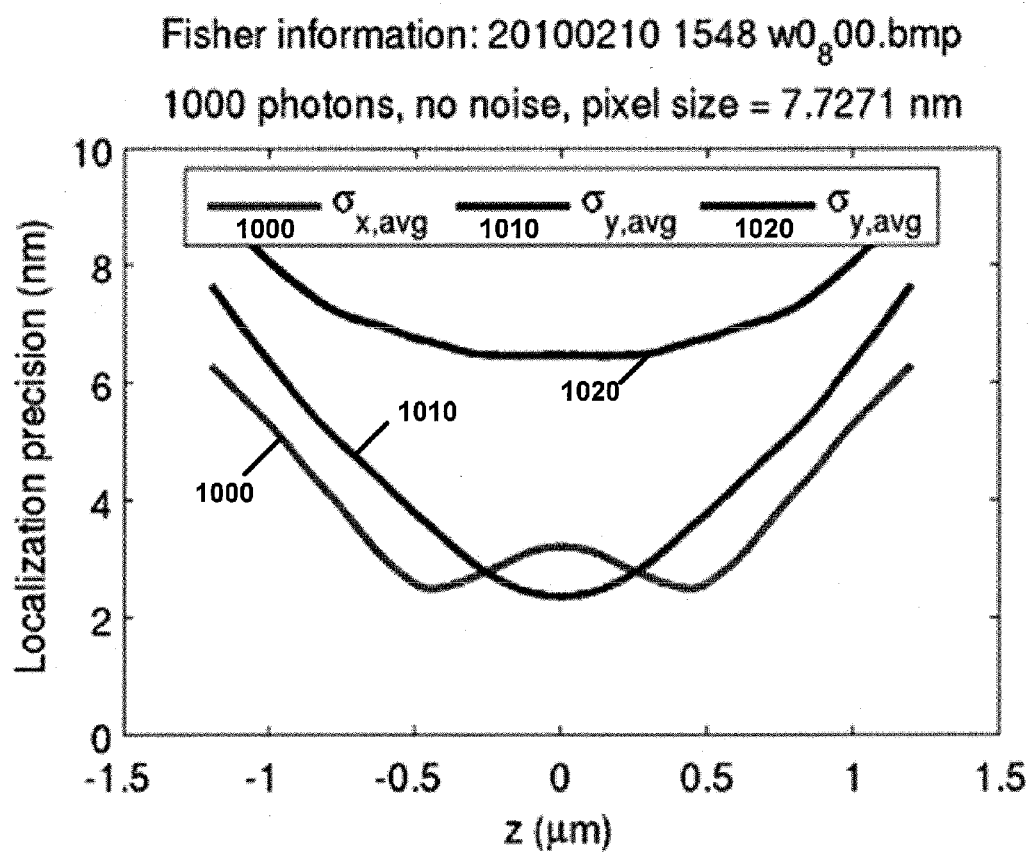
FIG. 10 shows an estimation of a point emitter's position information contained with a corkscrew point spread function in accordance with embodiments of the instant disclosure.

To quantitatively verify 3D localization capabilities, the FI content of the corkscrew PSF was calculated. FI is useful when comparing different PSFs because the Cramér-Rao bound (CRB), which is the inverse of the FI matrix, gives the lower bound on the variance of any unbiased estimator. Thus, if the corkscrew PSF is used to measure 3D position, the CRB gives a lower bound on the localization precision, independent of the actual estimator used during any experiment. The limit, or the square root of the CRB, is calculated for the corkscrew PSF with 1000 photons detected and no extra noise. FIG. 10 also shows a theoretical calculation about information of the z position of a point emitter within a corkscrew PSF. FIG. 10 shows the limit of localization precision (square root of the CRB) attainable by the corkscrew PSF in x (1000), y (1010), and z (1020) for 1000 detected photons and no extra noise. FIG. 10 shows <10 nm precision in all three dimensions over a 3.2 µm depth range. Note the relatively uniform localization precision over the center 2 µm depth of field.

Embodiments of the instant disclosure are additionally directed towards design of a high-efficiency phase mask using the aforementioned GL modes as the starting point. As a result, a mask similar to those depicted in FIG. 2A can be formed. This allows for the customization of the behavior of the corkscrew PSF for a desired application.

Figure 11:
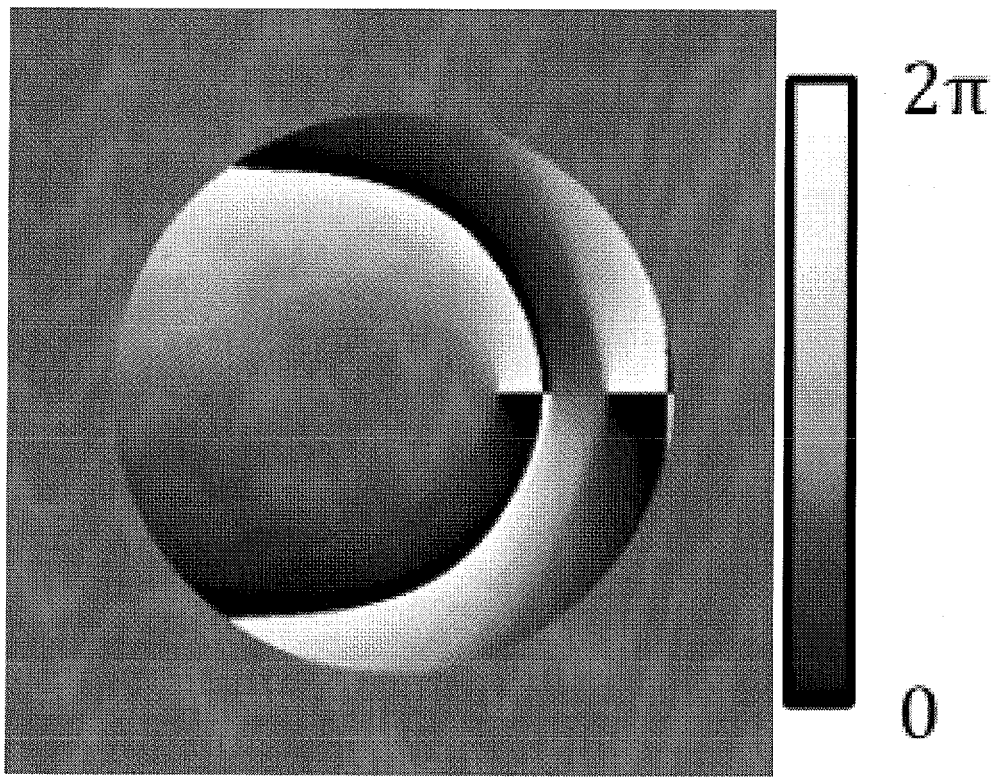
FIG. 11 shows a phase mask for generating a corkscrew point spread function in accordance with example embodiments of the instant disclosure.
Figure 12:
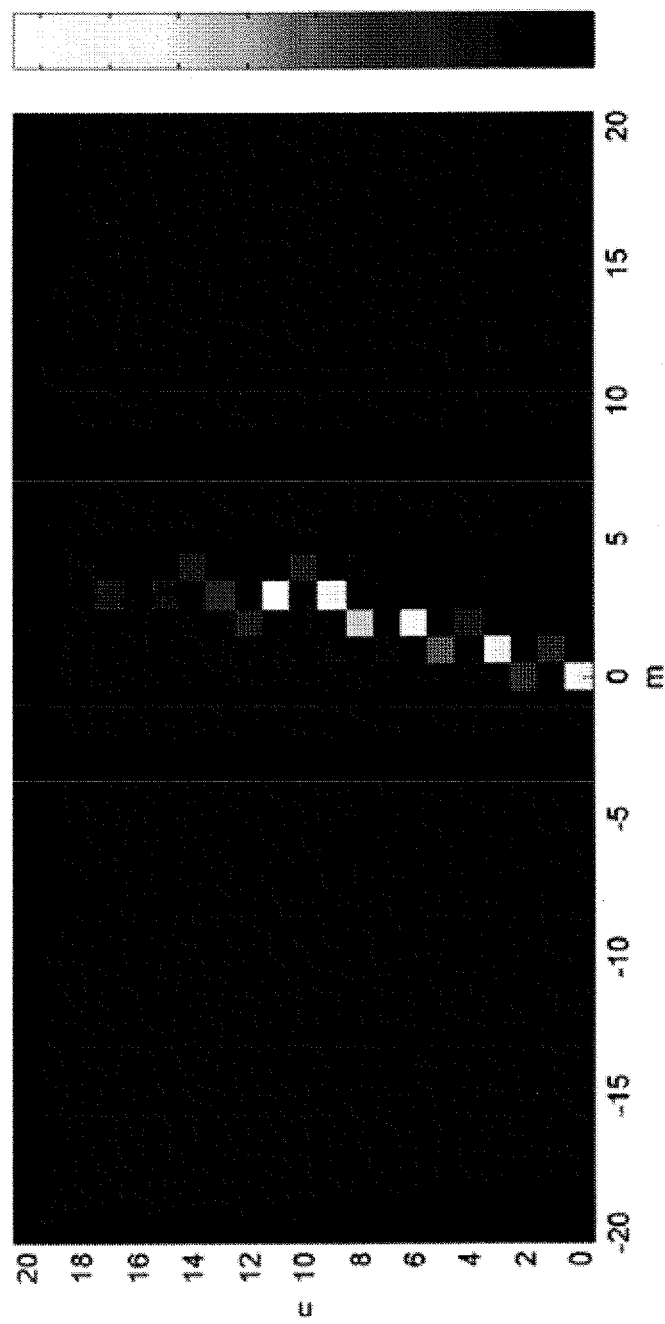
FIG. 12 shows the set of Laguerre-Gaussian (LG) modes contained within the phase-only corkscrew point spread function of FIG. 11.

Various aspects of the present disclosure are directed towards corkscrew PSF phase mask design by running an iterative optimization algorithm that utilizes GL modes as a starting point. The principal modes are the [n m]=[0 0], [3 1], [6 2], and [9 3] modes, but the corkscrew PSF contains other surrounding modes as well. The algorithm simultaneously enforces three constraints: (1) a phase-only mask in the Fourier plane of the 4f system; (2) a GL modal composition that is concentrated near the original superposition of modes described above; and (3) a Gaussian-like rotating spot in the image plane of the 4f system. A resulting mask, in accordance with various aspects of the present disclosure, is shown in FIG. 11. The cloud of GL modes surrounding the original superposition has the effect of limiting the rotation the corkscrew PSF to a finite depth range. The mask, such as the one shown in FIG. 11, can be placed in the Fourier plane (e.g., position 730 of FIG. 7) of a 4f optical arrangement to create a corkscrew PSF. The LG modes of the mask of FIG. 11 are shown FIG. 12.

Figure 13:
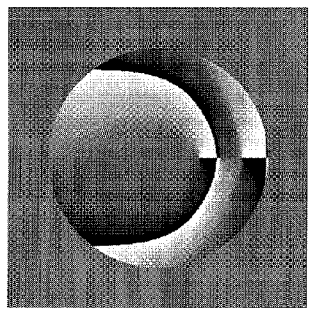
FIG. 13 shows an image of fluorescent beads using one mask.
Figure 13:
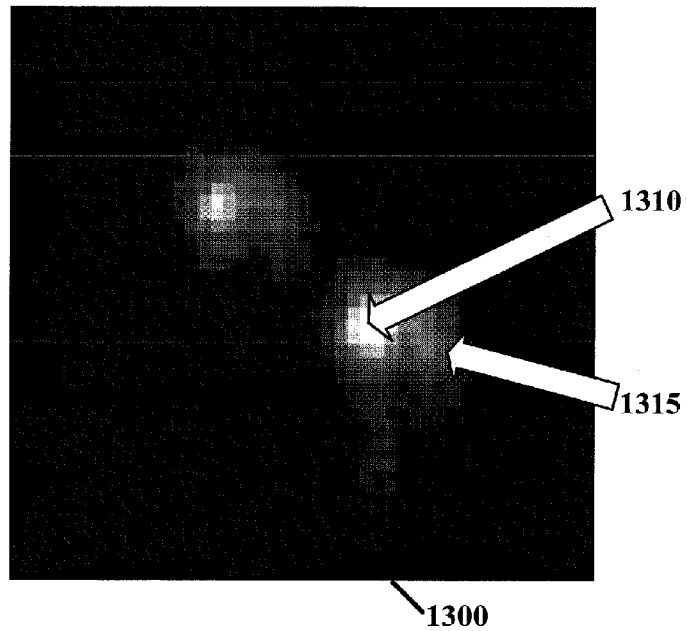
Figure 14:
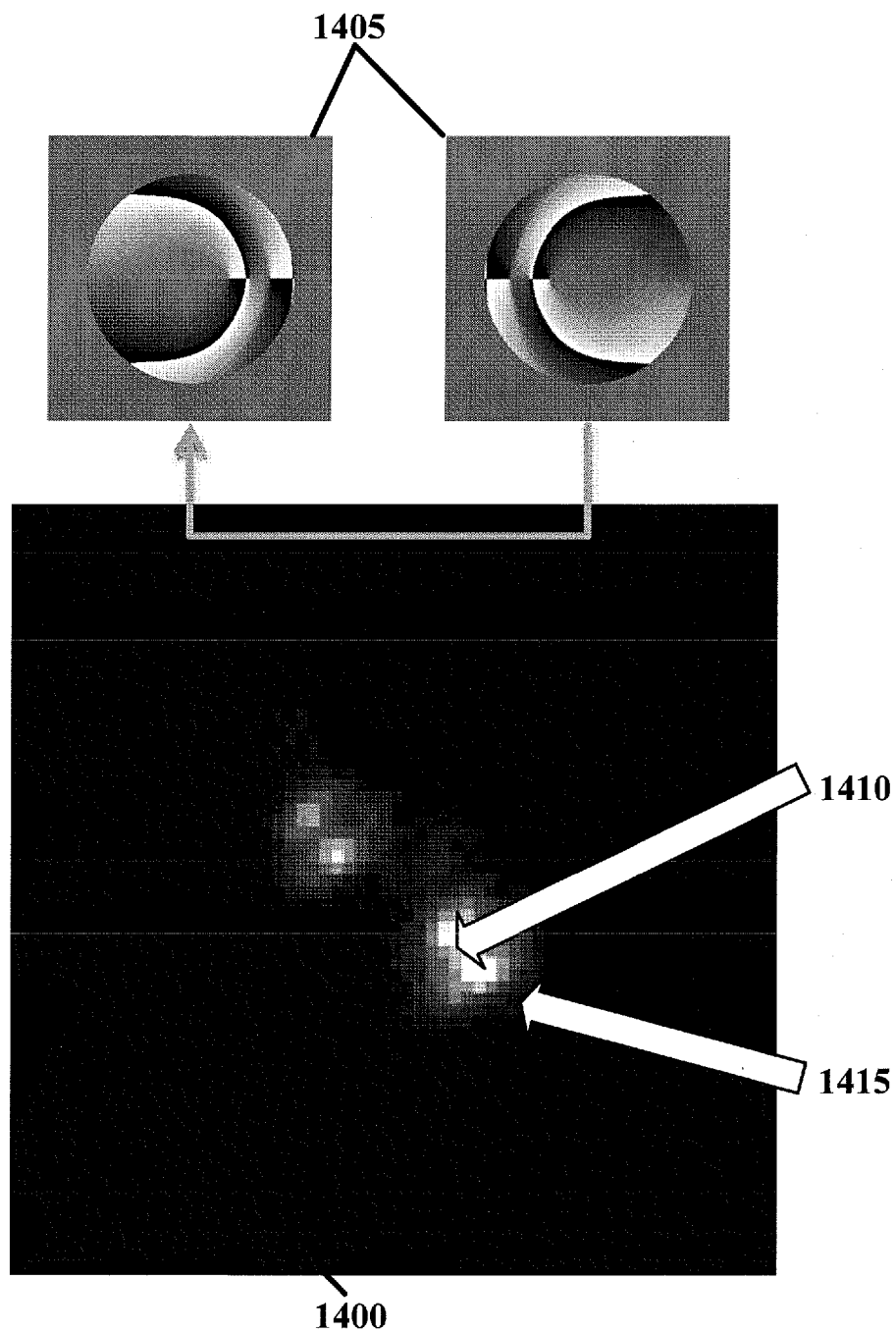
FIG. 14 shows images of fluorescent beads using two masks.
Figure 15:
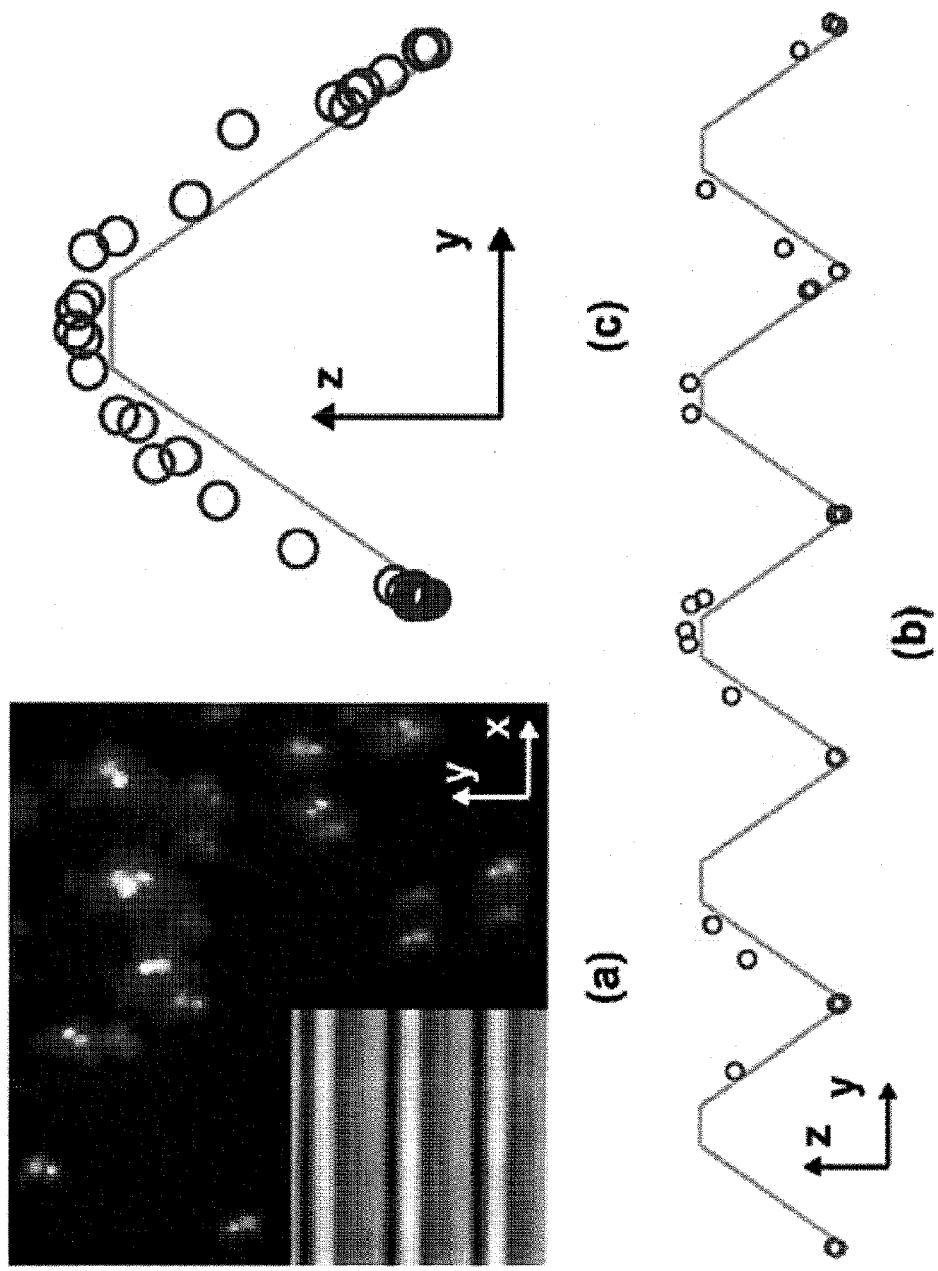
FIG. 15A shows a composite image of beads measured by the two corkscrew PSFs, consistent with various aspects of the present disclosure.
FIG. 15B shows bead locations projected along the axis of a periodic 3D structure (the x axis) and plotted as circles matching the bead diameter, consistent with various aspects of the present disclosure.
FIG. 15C shows bead locations from multiple corkscrew PSF measurements that have been combined, consistent with various aspects of the present disclosure.

FIGS. 13 and 14 show two different methods of obtaining two measurements/images for an object. FIG. 13 shows an image (1300) of the corkscrew PSF utilizing a single mask (1305) in accordance with embodiments of the instant disclosure. The image 1300 is a snapshot of a fluorescent bead taken during a 5-μm axial scan, with 50 nm per step. The acquisition rate of the EMCCD camera used was 10 Hz. 3D localization may be possible using a single snapshot of the corkscrew PSF (1300) by fitting the precise shape of the spot. The elongation of the spot (1315) changes as a function of z-position of the emitter being imaged; careful template matching of an acquired image from a sample against a series of instrument calibration images could yield precise xyz localizations. FIG. 14 shows an image (1400) utilizing two masks (1405) during a single camera acquisition. As described above, an angle between the midpoints (1410) of the two spots of the corkscrew PSF (1415) in each of the images (1400) produces a measured location. 3D wide field super-resolution imaging with the corkscrew PSF can be demonstrated by measuring the locations of fluorescent beads on a patterned PDMS surface, using atomic force microscope tip characterization grating (e.g., MikroMasch TGG, Estonia) as a mold for the PDMS. To image the beads with the corkscrew PSF, the labeled surface was placed face down and optically coupled to a glass coverslip with index-matched immersion oil. The beads were illuminated with an intensity of 10 W/cm$^2$ and sequentially imaged using the original and rotated versions of the corkscrew PSF. FIG. 15A shows a composite image of beads measured by the two corkscrew PSFs, consistent with various aspects of the present disclosure. The inset of FIG. 15A shows a white-light transmission image of the grating. The locations of beads that settled in the lowest level "valleys" of the grating are used to measure and compensate for the global tilt of the sample. FIG. 15B shows bead locations projected along the axis of the grating (the x axis) and plotted as circles matching the bead diameter, consistent with various aspects of the present disclosure. FIG. 15C shows bead locations from multiple corkscrew PSF measurements that have been grated together, consistent with various aspects of the present disclosure. A model of the PDMS structure, based on the dimensions of the silicon grating, is also shown in FIGS. 15B and C. The bead locations exhibit good agreement with the model, especially when accounting for the possible roughness of the PDMS surface. Measurements over multiple periods (peaks and valleys) of the grating are combined and plotted together FIG. 15C. This shows that the PDMS grating exhibits good periodicity over its lateral dimensions and that the corkscrew PSF can accurately localize objects throughout a large focal volume.

Figure 16:
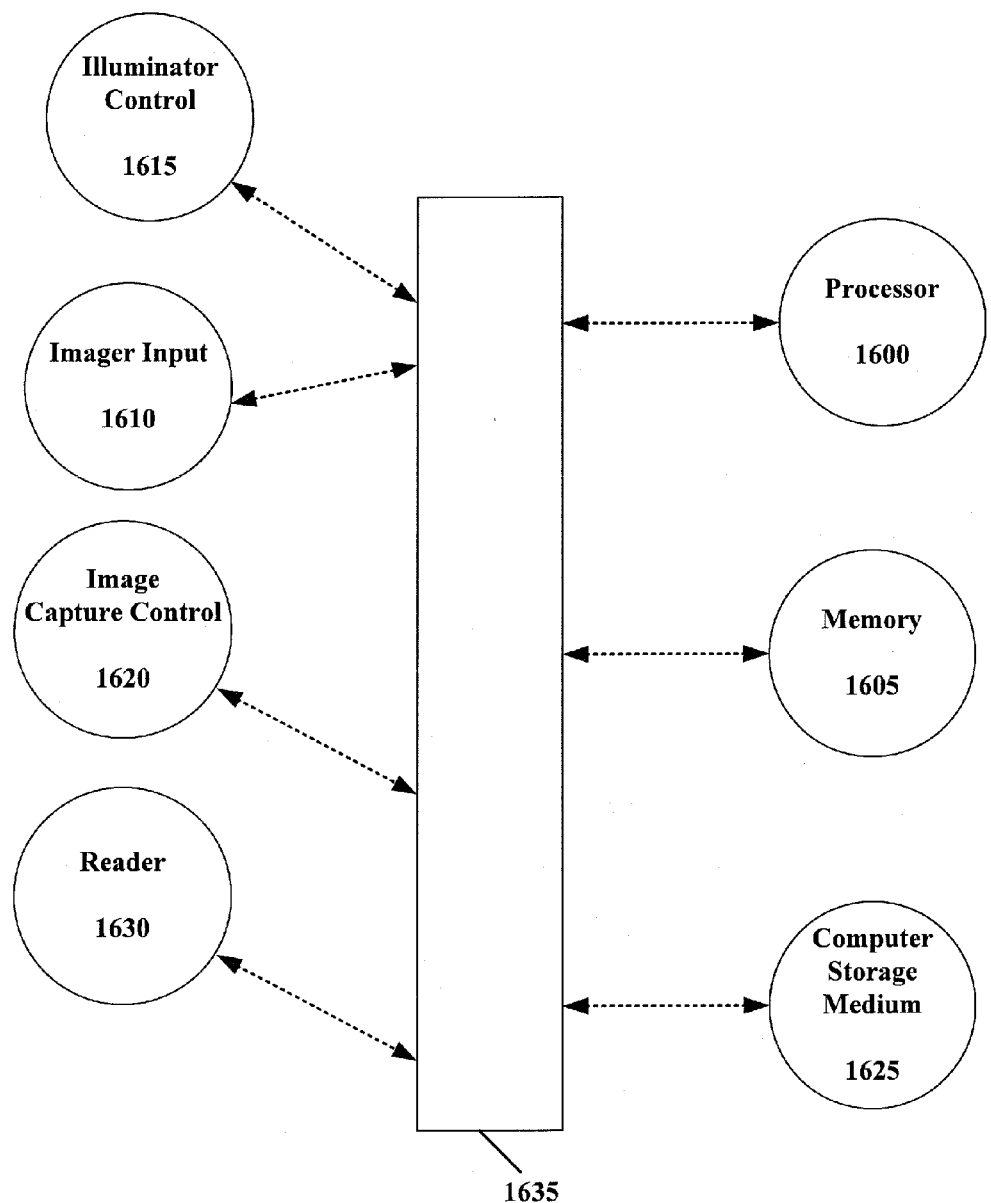
FIG. 16 shows a block diagram of a computer arrangement for implementation of an imaging apparatus or system consistent with example embodiments of the instant disclosure.

FIG. 16 shows a block diagram of a computer arrangement for implementation of an imaging apparatus or system consistent with example embodiments of the instant disclosure. The example CPU device shown in FIG. 16 includes a processer 1600, memory 1605, input 1610 for an imaging apparatus or system (consistent with the disclosure), illumination control 1615, image capture control 1620, a computer storage medium 1625 for implementation of software instructions, and a reader 1630 for the computer storage medium 1625. The hardware elements are coupled to one another using a data bus 1635.

Figure 17:
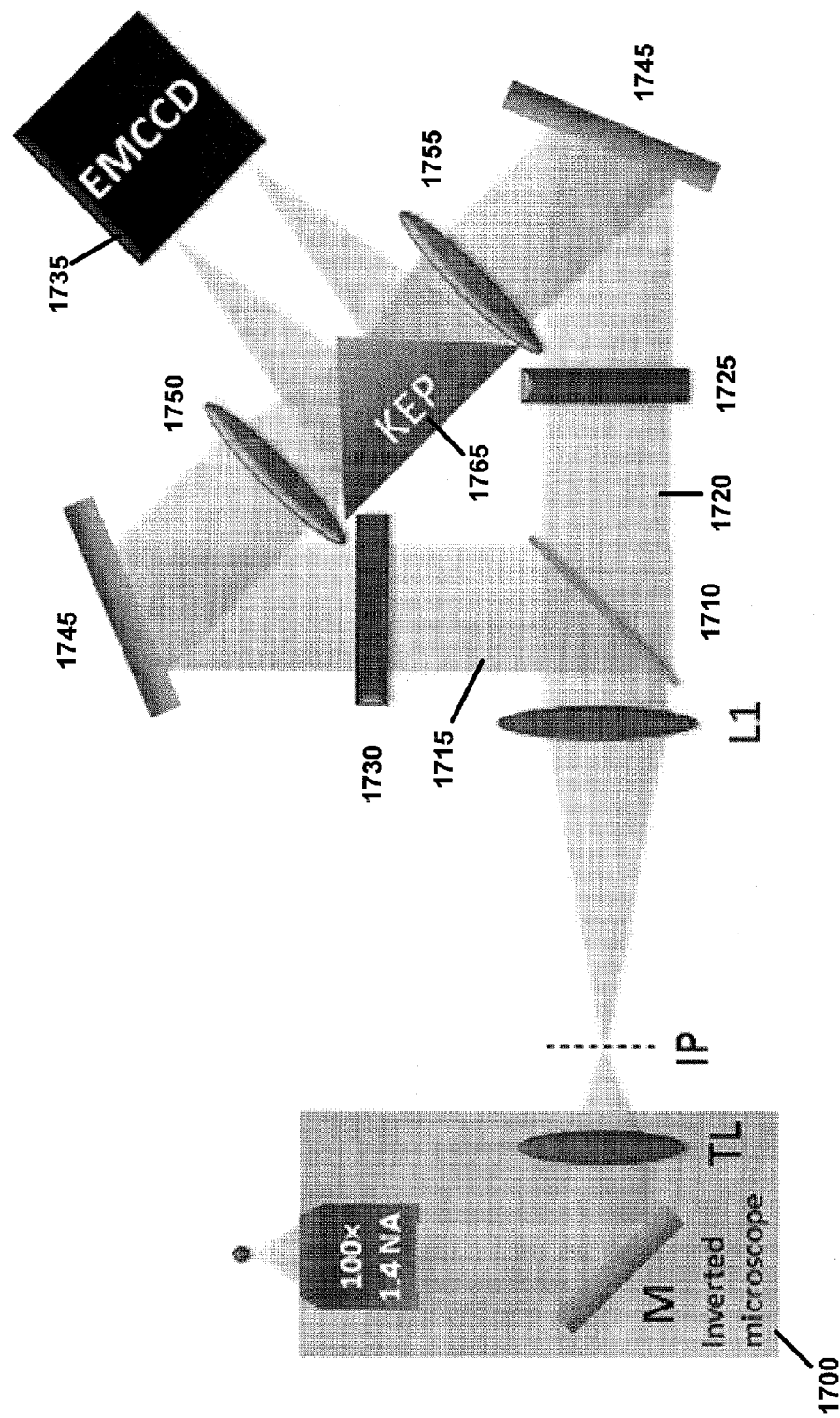
FIG. 17 shows another optical setup, consistent with various aspects of the present disclosure, which is added to a fluorescence microscope in a modular fashion.

FIG. 17 shows another optical setup, consistent with various aspects of the present disclosure, which is added to a detection channel 1700 of a standard fluorescence microscope in a modular fashion. In the arrangement shown in FIG. 17, a 50/50 beamsplitter 1710 separates the fluorescence from an inverted microscope into two channels 1715/1720. Two corkscrew phase masks 1725/1730, which may be fixed dielectric optical elements, rotated relative to one another, create corkscrew PSF images on the camera 1735, enabling 3D position determination with a single snapshot. The two channels 1715/1720 are directed towards mirror arrangements 1740/1745, after passing through the corkscrew phase masks 1725/1730. The light is then provided through two lenses 1750/1755 to a knife-edge prism 1765. The knife-edge prism 1765 reflects the fluorescence of each channel so that they are normal to the camera.

In certain more specific embodiments, the beamsplitter 1710 is a polarization beamsplitter (PBS) that creates two channels for polarized imaging. Additionally, in certain embodiments, the corkscrew phase masks 1725/1730 are replaced with other phase masks besides the corkscrew PSF (e.g., a cubic phase mask to create a large depth-of-field).

Consistent with the above-discussed and other aspects of the instant disclosure, the mask can be implemented as a continuous phase mask, a hologram, a diffractive optical element, or amplitude mask.

As another embodiment of the system, a multi-channel system can be employed to achieve different precisions of 3D localization, from coarse to fine. A multi-channel system would include multiple imaging sections. This system could have different masks to yield different corkscrew PSFs for each channel.

Figure 18:
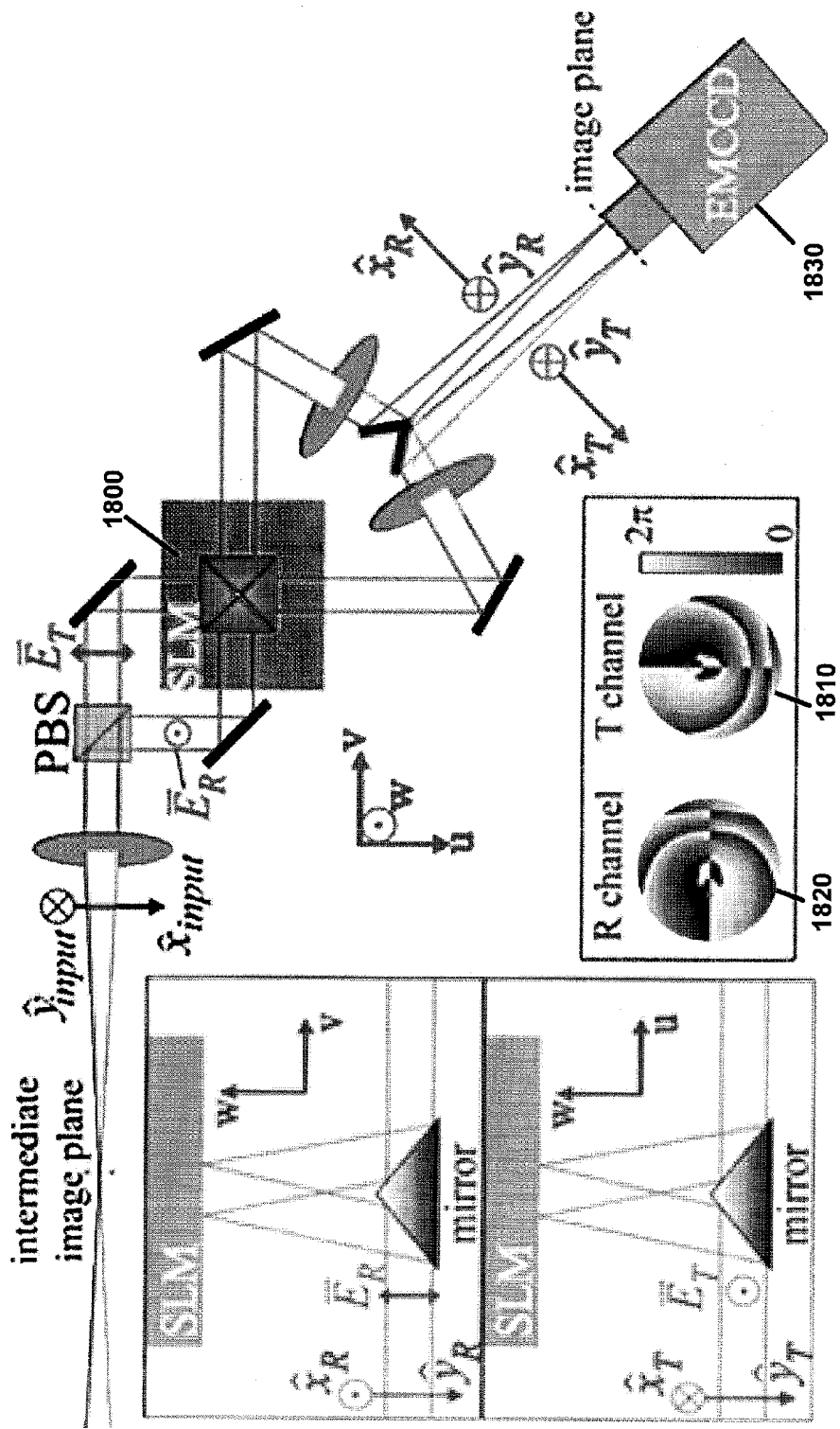
FIG. 18 shows another imaging arrangement for implementation of the corkscrew PSF, consistent with various aspects of the present disclosure.

FIG. 18 shows another imaging arrangement for implementation of the corkscrew PSF, consistent with various aspects of the present disclosure. The optical setup shown in FIG. 18 is added to the detection channel of a standard fluorescence microscope in a modular fashion. The corkscrew phase mask loaded onto the spatial light modulator 1800 appears rotated in the T channel 1810 relative to the R channel 1820. This enables 3D position determination with the corkscrew PSF using a single camera 1830 snapshot, and is highly photon-efficient.

Apparatus, arrangements and methods of the instant disclosure can also be used such that hyperspectral imaging can be achieved to measure the 3D locations of objects over a large range of wavelengths. This would require hyperspectral illumination of the scene, such as ultraviolet, visible, infrared, and microwave illumination. Imaging lenses would also be needed for all of the wavelengths of interest. Corkscrew PSF masks can be designed to work at each wavelength range using method S200. Photodetectors sensitive at each wavelength range are also needed. Finally, 3D locations of each object of interest can be measured using method S300.

In another embodiment of the system, the imaging version of the system 100 is used to examine a 3D scene in front of a motorized vehicle. The scene can be illuminated by the vehicle or by the environment. The method S300 can then be used to determine the distance from the vehicle to each of the objects for optical range-finding applications.

Reference may be made to the underlying provisional application (to which this patent document claims benefit), and which is fully incorporated herein by reference generally and for its discussion of related aspects and embodiments which can be implemented with the above-discussed embodiments.

Various nodes or modules may be implemented to carry out one or more of the operations and activities described herein and/or shown in the figures. In these contexts, a node or module refers to a circuit that carries out one or more of these or related operations/activities. For example, in certain of the above-discussed embodiments, one or more nodes/modules are discrete logic circuits or programmable logic circuits configured and arranged for implementing these operations/activities, as in the circuit nodes/modules shown in the Figures. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the present invention without strictly following the exemplary embodiments and applications illustrated and described herein. For instance, the various embodiments and features discussed herein can be used alone or as part of a combination of two or more embodiments or features. Such modifications do not depart from the true spirit and scope of the present invention, including that set forth in the following claims.

What is claimed is:

1. An apparatus having an optical pathway for passing light, the apparatus comprising:
   an optical detection node configured and arranged such that light passes through the optical pathway to the optical detection node where the light is detectable;
   at least one focusing element configured and arranged along the optical pathway;
   at least one optical mask configured and arranged to provide spatially-varying modulation on the light passing along the optical pathway, wherein the light passing along the optical pathway is redirected and modified, into a single spiral pathway, to create a single-spiral point spread function at the optical detection node; and
   wherein a single spot along the single spiral pathway provides an angular orientation to indicate an axial position of an object along the optical pathway relative to a focal plane.

2. The apparatus of claim 1, further including
   an optical detector located at the optical detection node, and
   a microscope, configured and arranged between the object and an image plane of the optical pathway, for presenting images to the optical pathway, wherein the angular orientation is defined by an angle of a line which is perpendicular to a rotation axis of the single spiral pathway and goes through the single spot.

3. The apparatus of claim 1, further including a light source for presenting light to the optical pathway, wherein the at least one optical mask is further configured and arranged to characterize the single spot in an image presented to the optical pathway by way of the single-spiral point spread function, and wherein the angular orientation relative to a rotation axis of the single spiral pathway encodes a z-position of the object.

4. The apparatus of claim 1, wherein said at least one focusing element and said at least one optical mask are arranged as an optical Fourier processor, wherein the at least one optical mask is further configured and arranged to characterize the single spot in an image presented to the optical pathway by way of the single-spiral point spread function, and wherein light emitted by the object follows single spiral pathway in three-dimensional space.

5. The apparatus of claim 1, further including an optical detector located at the optical detection node and configured and arranged to present detected signals to a detected-signal processing circuit, wherein the at least one optical mask and the single-spiral point spread function are configured and arranged to encode the axial position of the object via the single spot which revolves around a center of axis of the single spiral pathway as a function of the axial position of the object.

6. The apparatus of claim 5, further including a detected-signal processing circuit configured and arranged to process signals detected by the optical detector for at least one of: three-dimensional depth determination; tracking of a single nanoscale emitter; and deconvolution of an image, wherein the single-spiral point spread function rotates as a function of the axial position of the object and forms a shape of a spiral or corkscrew in three-dimensional space, wherein a rotation axis of the single-spiral point spread function is centered at a transverse (x, y) location of the object.

7. The apparatus of claim 1, wherein the at least one optical mask is located between two of said at least one focusing element, each respectively separated by a focal length wherein the at least one optical mask is further configured and arranged to break a symmetry of a response of the apparatus to z motion of the object.

8. The apparatus of claim 1, wherein the at least one optical mask facilitates or defines the single-spiral point spread function with sufficient accuracy to resolve emitters over a depth range greater than one (1) micron.

9. The apparatus of claim 2, further including a detected-signal processing circuit that is configured and arranged to process signals detected by the optical detector, wherein the single-spiral point spread function provides data at the optical detection node for providing data-signal processing of at least one of a widefield imaging mode and a confocal imaging mode.

10. The apparatus of claim 1, further including a microscope interface configured and arranged for securing the apparatus to a microscope at or near an image plane of the optical pathway.

11. The apparatus of claim 10, wherein the microscope interface is configured and arranged for securing the apparatus to the microscope removably by interlocking the apparatus with the microscope at the microscope interface, wherein the microscope interface provides an alignment mechanism configured and arranged for re-alignment between the apparatus and the microscope while preserving the single-spiral point spread function.

12. The apparatus of claim 1, further including a camera interface configured and arranged for securing the apparatus to a camera along an image plane of the optical pathway.

13. The apparatus of claim 12, wherein the camera interface is configured and arranged for securing the apparatus to the camera removably by interlocking the apparatus with the camera at the camera interface, wherein the camera interface provides an alignment mechanism configured and arranged for re-alignment between the apparatus and the camera while preserving the single-spiral point spread function, wherein the at least one optical mask is in a first orientation and a second orientation.

14. The apparatus of claim 2, further including a computer readable non-transitory storage medium comprising computer executable instructions, said instructions being adapted to:
  process signals detected by the optical detector, wherein the single-spiral point spread function provides data at the optical detection node for providing data-signal processing of a widefield imaging mode and a confocal imaging mode, the processing of signals including estimating the axial position of the object from an angle of a line connecting a single spot characterized by the single-spiral point spread function and a center of rotation of the single spot.

15. A method for passing light along an optical pathway, the method comprising:
  providing at least one focusing element and at least one optical mask in the optical pathway; and
  passing light through the optical pathway to an optical detection node where the light is detectable, wherein the passing light is redirected and modified into a single spiral pathway and to create a single-spiral point spread function at the optical detection node, wherein a single spot along the single spiral pathway provides an angular orientation to indicate an axial position of an object along the optical pathway relative to a focal plane.

16. The method of claim 15, further including providing an optical detector at the optical detection node to present detected signals to a detected-signal processing circuit, wherein the angular orientation is defined by an angle of a line which is perpendicular to a rotation axis of the single spiral pathway and goes through the single spot.

17. The method of claim 15, wherein the step of passing light through the optical pathway includes defining the single-spiral point spread function with sufficient accuracy to resolve emitters over a depth range greater than one (1) micron.

18. The method of claim 15, wherein the step of passing light through the optical pathway includes providing data at the optical detection node for providing data-signal processing of at least one of a widefield imaging mode and a confocal imaging mode.

19. The method of claim 16, further including utilizing a detected-signal processing circuit to process signals detected by the optical detector for three-dimensional depth determination including:
  processing a first image of the object obtained with the at least optical mask in a first orientation;
  processing a second image of the object obtained with the optical mask in a second orientation; and
  estimating the axial position of the object from an angle of a line connecting the single spot characterized by the single-spiral point spread function and a center of rotation of the single spot based on a midpoint between two measured locations of the single-spiral point spread function using the first image and the second image.

20. The method of claim 16, further including utilizing a detected-signal processing circuit to process signals detected by the optical detector for tracking of a single nanoscale emitter.

21. The apparatus of claim 14, wherein the instructions are adapted to determine the center of rotation of the single-spiral point spread function based on a midpoint between two measured locations of the single-spiral point spread function.

* * * * *